(12) United States Patent
Yamaguchi et al.

(10) Patent No.: US 7,143,355 B2
(45) Date of Patent: Nov. 28, 2006

(54) INFORMATION PROCESSING DEVICE FOR PROCESSING INFORMATION BASED ON A STATUS MONITORING PROGRAM AND METHOD THEREFOR

(75) Inventors: Yoshihiro Yamaguchi, Tokyo (JP); Shinsuke Noguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 10/085,655

(22) Filed: Feb. 26, 2002

(65) Prior Publication Data

US 2002/0149621 A1    Oct. 17, 2002

(30) Foreign Application Priority Data

Feb. 28, 2001    (JP) ............................. 2001-055936

(51) Int. Cl.
*G06F 3/00*     (2006.01)
*G06F 15/16*    (2006.01)
*G06F 9/44*     (2006.01)

(52) U.S. Cl. ...................... 715/733; 715/810; 717/115; 709/203

(58) Field of Classification Search ................ 340/825, 340/826, 783, 902, 810, 157, 163; 715/733, 715/810; 709/203; 717/115
See application file for complete search history.

(56) References Cited

U.S. PATENT DOCUMENTS

| | | | | |
|---|---|---|---|---|
| 4,755,808 A * | 7/1988 | Bullock et al. | ............. | 345/163 |
| 5,523,754 A * | 6/1996 | Eisen et al. | .................... | 341/20 |
| 5,748,185 A * | 5/1998 | Stephan et al. | ............. | 345/173 |
| 5,818,437 A * | 10/1998 | Grover et al. | .............. | 345/811 |
| 5,856,827 A * | 1/1999 | Sudo | ........................... | 345/841 |
| 5,999,169 A * | 12/1999 | Lee | .............................. | 345/163 |
| 6,286,003 B1 * | 9/2001 | Muta | ........................... | 707/10 |
| 6,295,052 B1 * | 9/2001 | Kato et al. | ................... | 345/179 |
| 6,317,739 B1 * | 11/2001 | Hirata et al. | .................... | 707/4 |
| 6,453,270 B1 * | 9/2002 | Durbin | ....................... | 702/188 |
| 6,636,929 B1 * | 10/2003 | Frantz et al. | ............... | 710/313 |

OTHER PUBLICATIONS

"Improving PC Ease of Use: A Report from the Ease of Use/PC Quality Roundtable",Prepared by: Ease of Use Roundtable,Intel Corp,Aveo Inc,Compaq Computer Corp,Dell Computer Corp,Gateway/Inc,IBM Corp,Lucent Technologies,Nortel Networks,Visual Networks. Feb. 2000.*

* cited by examiner

*Primary Examiner*—Kieu D. Vu
*Assistant Examiner*—Ting Zhou
(74) *Attorney, Agent, or Firm*—Frommer Lawrence & Haug LLP; William S. Frommer; Thomas F. Presson

(57) ABSTRACT

A jog dial server monitors an operation notification by a jog dial, then decides the operation based on the operation notification, and executes the decided operation as a jog script engine. The jog dial server loads a script file describing status transition of the jog dial in the script language at the time of start-up, then reads the status transition, and operates in accordance with the status transition thus read. Thus, an information processing device is provided which enables extension of the operation with respect to an application incompatible with the jog dial.

8 Claims, 27 Drawing Sheets

INFORMATION PROCESSING DEVICE FOR PROCESSING INFORMATION BASED ON A STATUS MONITORING PROGRAM AND METHOD THEREFOR

BACKGROUND OF THE INVENTION

1. Field of the Invention

This invention relates to an information processing device and an information processing method for carrying out processing based on an input operation by a user using an input device for carrying out rotation and press operations, a program based on the information processing method, and a recording medium having the program recorded thereon.

2. Description of the Related Art

Recently, in order to improve the user-friendliness of a portable information processing device and the user-friendliness of application software, for example, a device having a rotation/press-type operating unit called jog dial provided on a lateral side of the body is commercially available from the present Applicant. The jog dial is provided on one of the left and right lateral sides of the body. The jog dial is rotatable forward and backward around an axial line set in the up-and-down direction and is displaceable by pressing.

One usage of this jog dial is, for example, to select one of a plurality of application software programs displayed on a display screen by a scroll method using forward and backward rotations of the jog dial, and press the jog dial in the state where an application is selected, thus causing execution of the selected application. The mechanical changes resulting from the operation of such a jog dial basically includes three-dimensional elements, that is, rotations in the two directions and displacement by pressing. In addition, the quantity of rotation in each direction, and the rotation speed in each direction of rotation calculated from the quantity of rotation can be provided. Therefore, by associating the changes accompanying the operation of the jog dial with specific functions of the information processing device, or by associating these changes with various functions in application software, the user-friendliness is significantly improved.

For example, in association with the input operation using the jog dial, a graphical user interface including a guide status and a list view status, as shown in FIGS. 1 and 2, is displayed on the display screen of the information processing device.

The status transition between the guide status and the list view status must be prepared on the application side by using a jog dial application interface.

An application tuned by using the jog dial application interface is referred to as jog dial-compatible application, which is discriminated from an untuned application referred to as jog dial-incompatible application.

In the case of a jog dial-incompatible application, the control which is generally considered to be held by all applications as shown in FIG. 3 is emulated from outside and the predominance proper to the jog dial is not utilized sufficiently.

Specifically, as shown in FIG. 3, in the jog dial-incompatible application of the initial state S, a list view status L is displayed. If "scroll" is selected in this list view status L, the status shift to a guide status G related to scroll. If "status back" is selected in the guide status G related to scroll, the status shifts back to the list view status L. On the other hand, if "menu" is selected in the list view status L, the status shifts to a guide status related to menu selection. If "select/back" is selected in the guide status G related to menu selection, the information processing device is caused to execute a selected menu item. If "select/back" is pressed longer, the status shifts back to the list view status L.

SUMMARY OF THE INVENTION

In view of the foregoing status of the art, it is an object of the present invention to provide an information processing device and an information processing method which enable extension of the operation with respect to an application incompatible with the jog dial. It is another object of the present invention to provide an information processing device and an information processing method which enable various support of the operation of the jog dial by using the script language.

An information processing device according to the present invention is adapted for carrying out processing based on an input operation by a user using an input device for carrying out rotation and press operations. The information processing device comprises: server means for monitoring an operation notification by the input device and determining and executing the operation based on the operation notification; wherein the server means loads, at the time of start-up, a script file describing the status transition of the input device in the script language, reads the status transition corresponding to the operation of the input device, and executes the operation corresponding to the read status transition thus read.

An information processing method according to the present invention is adapted for carrying out information processing based on an input operation by a user using an input device for carrying out rotation and press operations. The information processing method comprises: a processing execution step of monitoring an operation notification by the input device and determining and executing the operation based on the operation notification; wherein at the processing execution step, a script file describing the status transition of the input device in the script language is loaded at the time of start-up, then the status transition corresponding to the operation of the input device is read, and the operation corresponding to the status transition thus read is executed.

A recording medium according to the present invention has an information processing program recorded thereon, the information processing program being adapted for carrying out information processing based on an input operation by a user using an input device for carrying out rotation and press operations. The information processing program comprises: a processing execution step of monitoring an operation notification by the input device and determining and executing the operation based on the operation notification; wherein at the processing execution step, a script file describing the status transition of the input device in the script language is loaded at the time of start-up, then the status transition corresponding to the operation of the input device is read, and the operation corresponding to the status transition thus read is executed.

A program according to the present invention is related to information processing for carrying out information processing based on an input operation by a user using an input device for carrying out rotation and press operations. The program comprises: a processing execution step of monitoring an operation notification by the input device and determining and executing the operation based on the operation notification; wherein at the processing execution step, a script file describing the status transition of the input device in the script language is loaded at the time of start-up, then the status transition corresponding to the operation of the input device is read, and the operation corresponding to the status transition thus read is executed.

DESCRIPTION OF THE PREFERRED EMBODIMENTS

Figure 1:
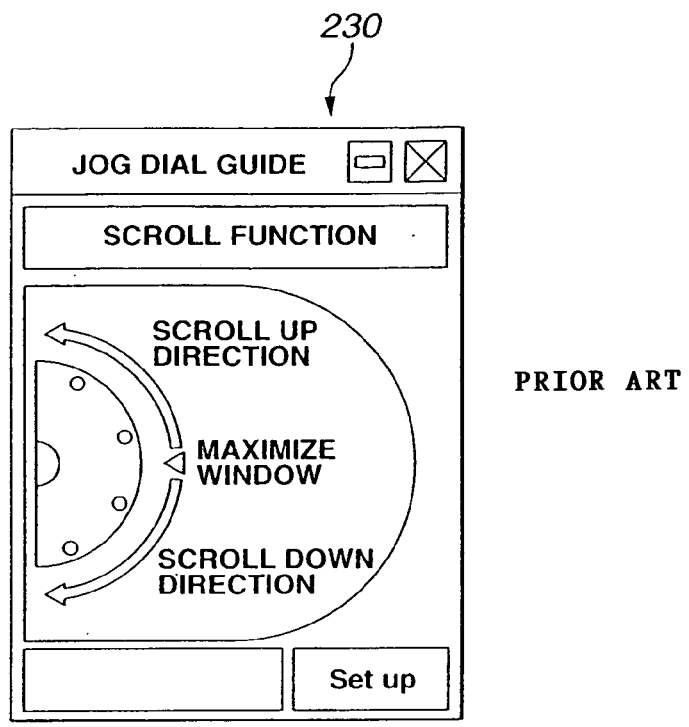
FIG. 1 is a prior art view showing a specific example of a guide status.
Figure 2:
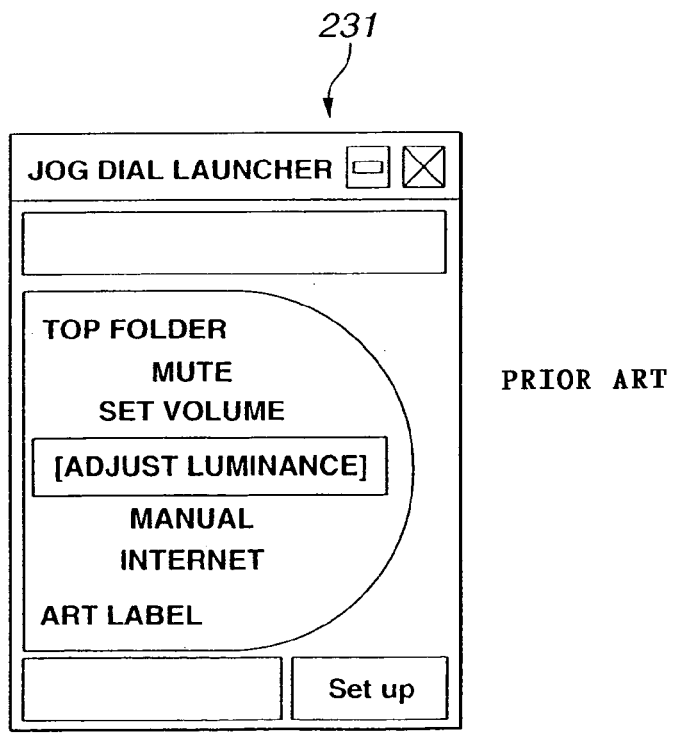
FIG. 2 is a prior art view showing a specific example of a list view status.
Figure 3:
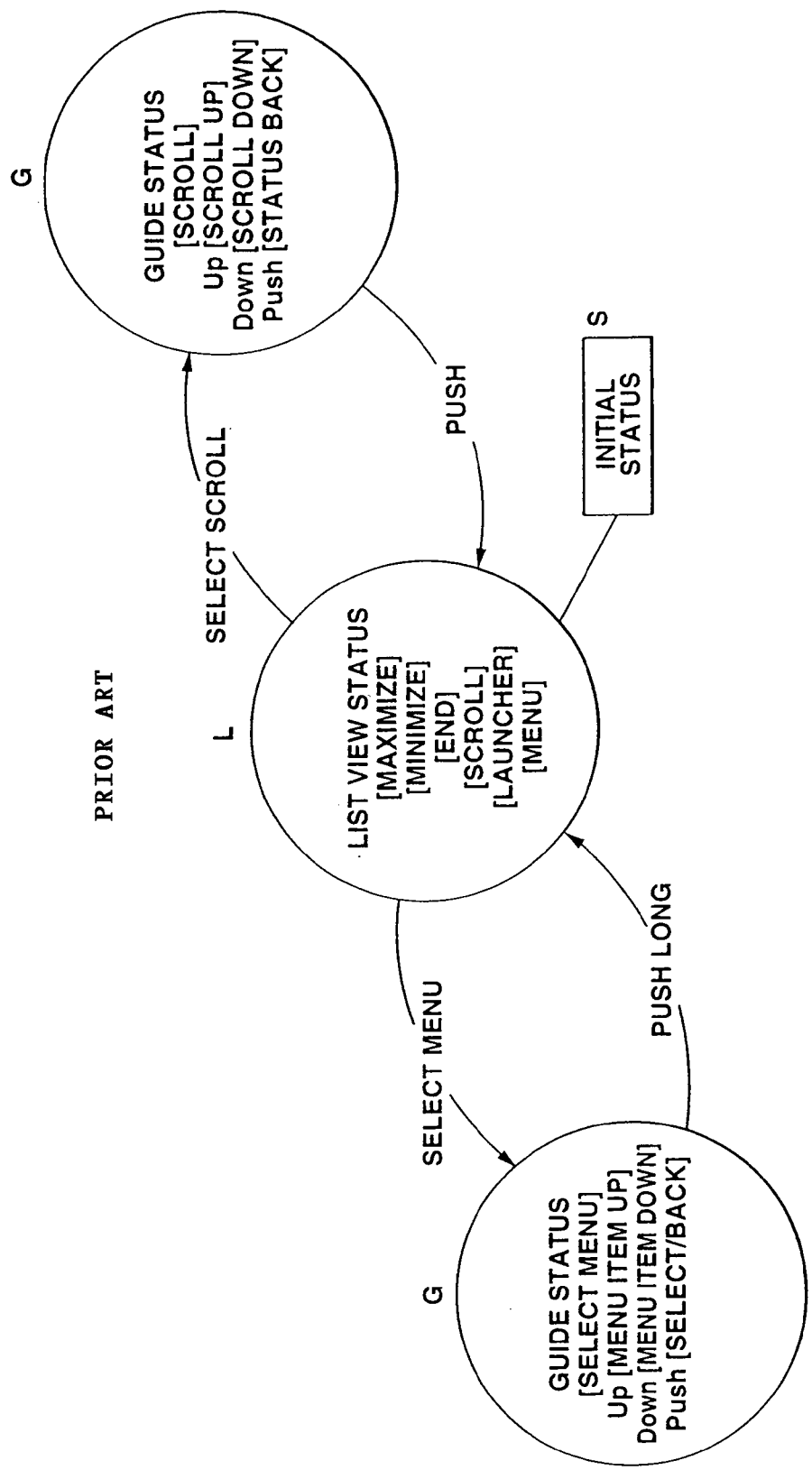
FIG. 3 is a prior art view showing status transition of a jog dial-incompatible application.
Figure 4:
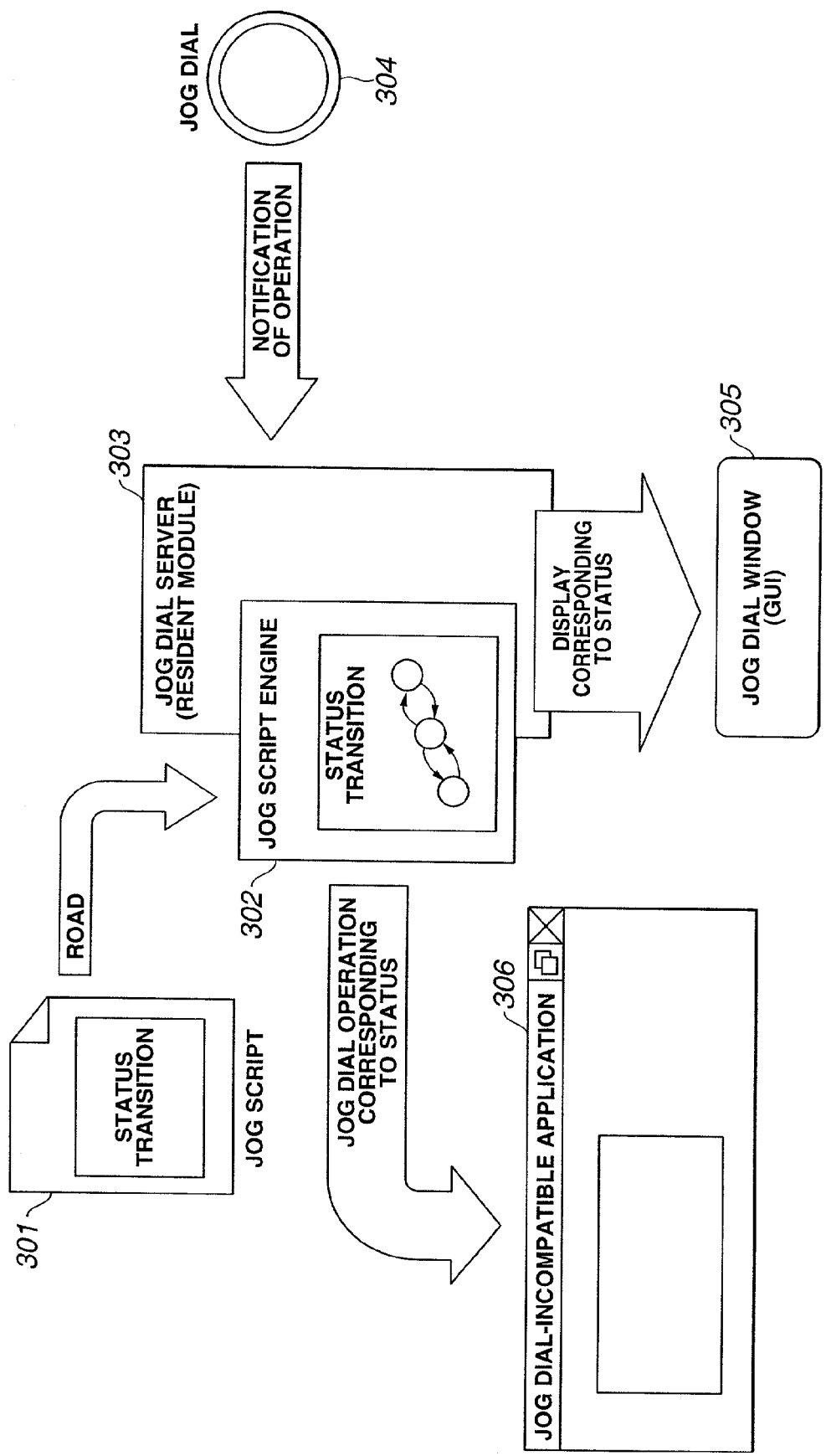
FIG. 4 is a block diagram showing the structure of an information processing device as an embodiment of the present invention.

A preferred embodiment of the present invention will now be described with reference to the drawings. As shown in FIG. 4, this embodiment applies to an information processing device for carrying out processed based on an input operation by a user using a jog dial 304, which is an input device for carrying out rotation and press operations. When a jog dial-incompatible application is to be executed, a script file describing status transition and the like of the jog dial is loaded from a predetermined storage, for example, via the Internet, so as to read out the status transition and the like described in the script file, and the operation associated with the jog dial is carried out in accordance with the status transition.

In addition to the jog dial 304, this information processing device also has a jog dial server 303 which monitors an operation notification by the jog dial 304, decides the operation based on the operation notification and executes the decided operation as a jog script engine 302. When started up, the jog dial server 303 loads a script file 301 describing status transition of the jog dial 304 in the script language, then reads the status transition, and operates as the jog script engine 302 in accordance with the status transition thus read.

Then, a display corresponding to the operation status of the jog dial 302 is represented on a display screen 305 as a graphical user interface.

In this manner, the jog dial operation exhibiting the predominance of the jog dial 304 can be carried out also in a jog dial-incompatible application 306.

The jog dial server 303 loads the script file 301 and decides the operation and display in accordance with the status transition. The status transition based on the difference in hardware can be supported simply by changing the jog script file 301. Moreover, since setting for each type of jog dial-incompatible application can be made, various support may be possible.

The script file 301 is a file which describes the status transition and the like of the jog dial in the script language and is loaded by the jog dial server 303. In this script file 301, the status transition, the display content of each status, and the operation of each status can be described.

The status transition represents how each status shifts in what situation. The status transition can be caused to correspond to the status transition based on the selection by the user, the activation of the menu, and the shift of the focus.

The display content of each status designates whether the status is a guide status or a list view status, what item column is included in the list view status, what character string is displayed in the guide status, and so on.

The operation of each status can describe the following items when the jog dial is operated in each status: first, keyboard input; second, mouse input; and third, access to an external module. By emulating the keyboard input and the mouse input or allocating these inputs to the up and down keys, selection and execution of a menu item can be supported. Moreover, by reading the external module, more complicated operations can be carried out.

Figure 5:
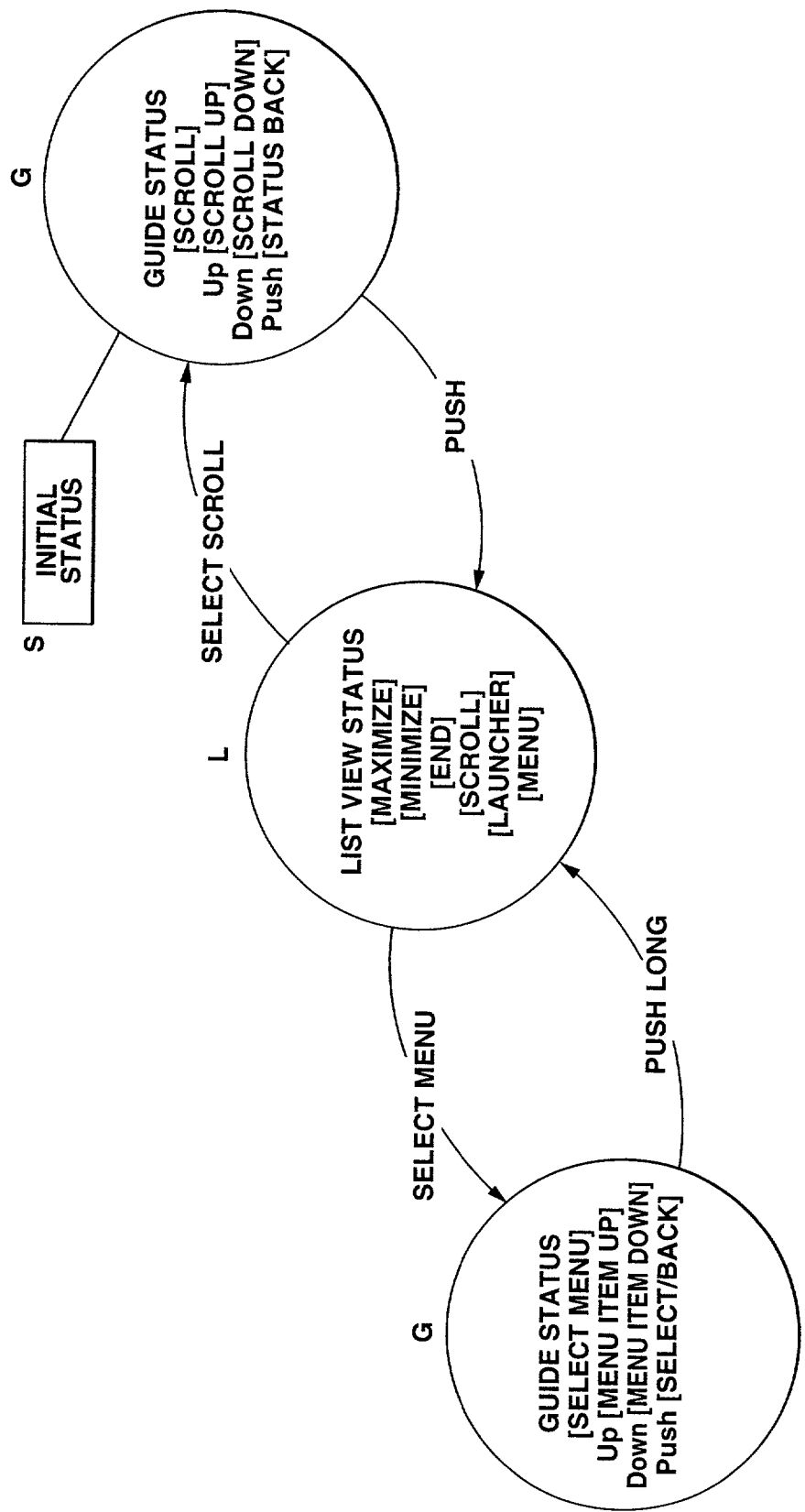
FIG. 5 is a view showing a specific example of status transition by jog script.
Figure 6:
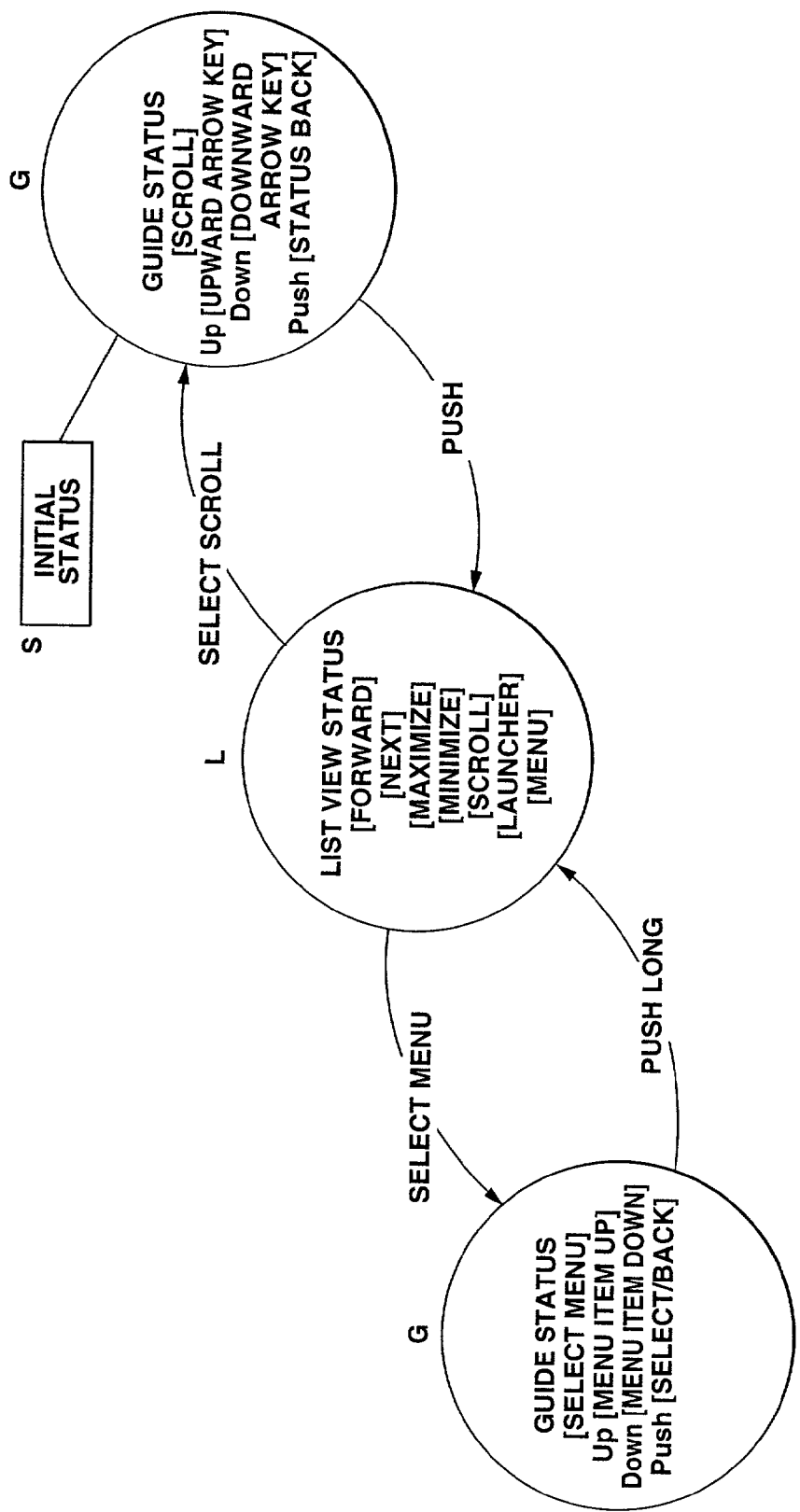
FIG. 6 is a view showing a specific example of status transition by jog script.

FIGS. 5 and 6 show specific examples of the status transition based on the jog script, in view of the status transition and application-specific support.

First, FIG. 5 shows an example in which the starting status is a guide status for scroll, emphasizing the linkage with a touch pad of a center jog, which will be described later.

When the jog dial is provided between a left click button and a right click button and near a touch pad, as will be described later, it is desired that the initial display of the graphical user interface after the power switch is turned on is the guide status rather than the list view status. This is because the guide status for scroll emphasizing the linkage with the touch pad is desired.

Therefore, the following contents are described in the script file 301. The status transition for shifting to and from the guide status for [scroll], the list view status and the guide status for [select menu] is described as shown in FIG. 5. With the list view status provided at the center, that is, via the list view status, the status shifts between the two guide statuses.

In the guide status, the display of [scroll], Up [scroll up], Down [scroll down] and Push [status back] is designated. In the other guide status, the display of [select menu], Up [menu item up], Down [menu item down] and Push [select/back] is designated. In the list view status, the display of [maximize], [minimize], [end], [scroll], [launcher] and [menu] is designated.

With respect to the operation of each status, for example, what operation [scroll] in the guide status is, or where the status is back to by the operation of [status back], is described. In the case of the list view status, what operations [maximize], [minimize], [end], [scroll], [launcher] and [menu] are, is described.

The script file 301 in which the status transition, the display content of each status, and the operation of each status are described is loaded by the jog dial server 303 when the information processing device shown in FIG. 4 is started up. Then, the jog dial server 303 reads the status transition and the like, and executes the operation corresponding to the status transition and the like thus read, in accordance with the operation status of the jog dial 304.

Thus, the information processing device operates in accordance with the status transition shown in FIG. 5. Specifically, after the power switch is turned on, the graphical user interface of the guide status G is displayed on the display screen as the initial status S. It is the guide status for scrolling. If the jog dial is pressed to select [status back], the status shifts to the list view status L. If [scroll] is selected in the list view status, the status shifts back to the guide status G for scroll. If [menu] is selected in the list view status, the status shifts to the guide status G for menu selection. In this guide status G for menu selection, selection of menu items in the up-and-down direction can be carried out in accordance with the rotation operation of the jog dial. If [select/back] is pressed by using the jog dial, the information processing device is caused to execute the selected menu item. If [select/back] is pressed longer by using the jog dial, the status shifts back to the list view status L.

FIG. 6 shows the status transition of the jog dial in the case where the information processing device shown in FIG. 4 executes an Internet web browser, which is a jog dial-incompatible application. In this example, too, the starting status is the guide status for scroll.

In the script file 301, status transition to and from the guide status for [scroll], the list view status and the guide status for [select menu] is described as shown in FIG. 6. With the list view status provided at the center, that is, via the list view status, the status shifts between the two guide statuses.

In the guide status, the display of [scroll], Up [upward arrow key], Down [downward arrow key] and Push [status back] is designated. In the other guide status, the display of [select menu], Up [menu item up], Down [menu item down] and Push [select/back] is designated. In the list view status, the display of [maximize], [minimize], [end], [scroll], [launcher], [menu] as well as [forward] and [next] is designated. In addition, the display of [save] and [select all] may be designated.

With respect to the operation of each status, for example, what operation [scroll] in the guide status is, or where the status is back to by the operation of [status back], is described. In the case of the list view status, what operations [maximize], [minimize], [end], [scroll], [launcher], [menu], [forward] and [next] are, is described.

The script file 301 in which the status transition, the display content of each status, and the operation of each status are described is loaded by the jog dial server 303 when the information processing device shown in FIG. 4 is started up. Then, the jog dial server 303 reads the status transition and the like, and executes the operation corresponding to the status transition and the like thus read, in accordance with the operation status of the jog dial 304.

Thus, the information processing device operates in accordance with the status transition shown in FIG. 6 when executing the Internet web browser. Specifically, after the power switch is turned on, the graphical user interface of the guide status G is displayed on the display screen as the initial status S. It is the guide status for scrolling. If the jog dial is pressed to select [status back], the status shifts to the list view status L. If [scroll] is selected in the list view status, the status shifts back to the guide status G for scroll. If [menu] is selected in the list view status, the status shifts to the guide status G for menu selection. In this guide status G for menu selection, selection of menu items in the up-and-down direction can be carried out in accordance with the rotation operation of the jog dial. If [select/back] is pressed by using the jog dial, the information processing device is caused to execute the selected menu item. If [select/back] is pressed longer by using the jog dial, the status shifts back to the list view status L. Particularly, in the list view status, by selecting [forward] or [next] using the jog dial, the user can easily carry out the operation to shift back to the previous screen or shift to the next screen on the Internet browser.

Therefore, with this information processing device, the predominance proper to the jog dial can be utilized satisfactorily.

Hereinafter, several examples of the information processing device will be described.

Figure 7:
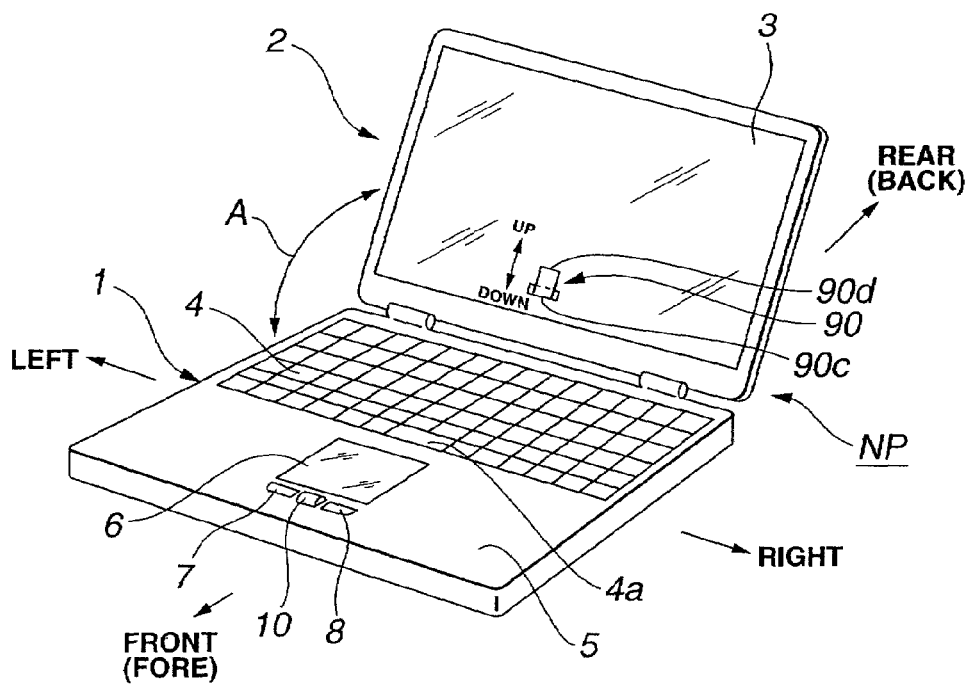
FIG. 7 is a perspective view showing the appearance of a notebook model personal computer.

First, a first specific example is a notebook model personal computer NP as shown in FIG. 7. A recording medium having a program of the present invention recorded thereon is embedded or loaded to the notebook model personal computer NP, thus carrying out an information processing method of the present invention.

The notebook model personal computer NP has a body 1 and a cover 2 mounted to be freely opened and closed on the body 1. Specifically, the cover 2 is connected to a rear end portion of the body 1 so that the cover 2 can freely swing around an axial line set in the left-and-right direction. The cover 2 is caused to swing on the body 1 as indicated by an arrow A in FIG. 7, thereby selectively taking a closed state in which the cover 2 is superimposed on the body 1 or an open state in which the cover 2 stands up as shown in FIG. 7. In this specification, the front-and-back direction and the left-and-right direction are set as the directions shown in FIG. 7.

A flat display screen 3 made of liquid crystal or the like is provided on the inner surface of the cover 2. On this display screen 3, a graphical user interface is displayed which is used for explaining the operation of an operating unit 10 as an input device, as will be described later, to a user through an image.

FIG. 7 shows the graphical user interface in a guide status 90 (which will be described later). This guide status 90 is a display status for displaying what processing the notebook model personal computer NP of FIG. 7 can currently carry out and for causing the user to select processing. Other than this guide status 90, the graphical user interface also enters a list view status, which will be described later. The list view status is a display status for displaying a list of items which can be executed in the notebook model personal computer and for causing the user to select an item.

In the present invention, when a jog dial-incompatible application is to be executed on the notebook model personal computer NP, the script file 301 in which the status transition to and from the guide status and the list view status, the display content of each status and the operation of each status are described is loaded by the jog dial server 303, as described above. Then, the jog dial server 303 reads the status transition and the like from the script file 301 and executes the operation corresponding to the status transition thus read, in accordance with the operation status of the jog dial 304.

In the case of a jog dial-compatible application, the application side declares to the jog dial server 303 that it is compatible with the jog dial and how the status transition, display and operation are carried out. Therefore, the information processing method of the present invention is not executed as a program on the notebook model personal computer NP.

The description of the notebook model personal computer NP will be continued now. A keyboard 4 is provided on the upper surface of the body 1. This keyboard 4 includes multiple keys such as alphabetic keys, ten keys, and various function keys. The keyboard 4 is elongated in the left-and-right direction as a whole and is situated on the rear portion of the upper surface of the body 1. The portion before the keyboard 4, of the upper surface of the body 1, is a palm rest 5 having a large area.

On the palm rest 5, which is on the upper surface of the body 1 and more specifically before the keyboard 4, a touch pad 6, a left click button 7 and a right click button 8 are provided. As shown in detail in FIG. 8, the touch pad 6 is substantially square and is arranged at a position which is substantially middle in the left-and-right direction of the body 1 and closer to the keyboard 4. More specifically, the back line part of the touch pad 6 extending along the front line part of the keyboard 4 is situated near a space key 4a of the keyboard 4, which is used very frequently. The left and right click buttons 7, 8 are arranged before the touch pad 6 and near the touch pad 6 so that these click buttons are situated substantially in the middle of the left-and-right direction of the body 1. The touch pad 6 is a kind of so-called pointing device, as is already known.

The left click button 7 and the right click button 8 are arranged at a small spacing from each other in the left-and-right direction and a rotation/press-type operating unit 10 is provided in the spacing between the left and right click buttons 7, 8. In this manner, the left click button 7, the operating unit 10 and the right click button 8 are arranged in series in the left-and-right direction of the body 1. The operating unit 10 is situated very close to the left and right click buttons 7, 8 and very close to the touch pad 6.

Figure 8:
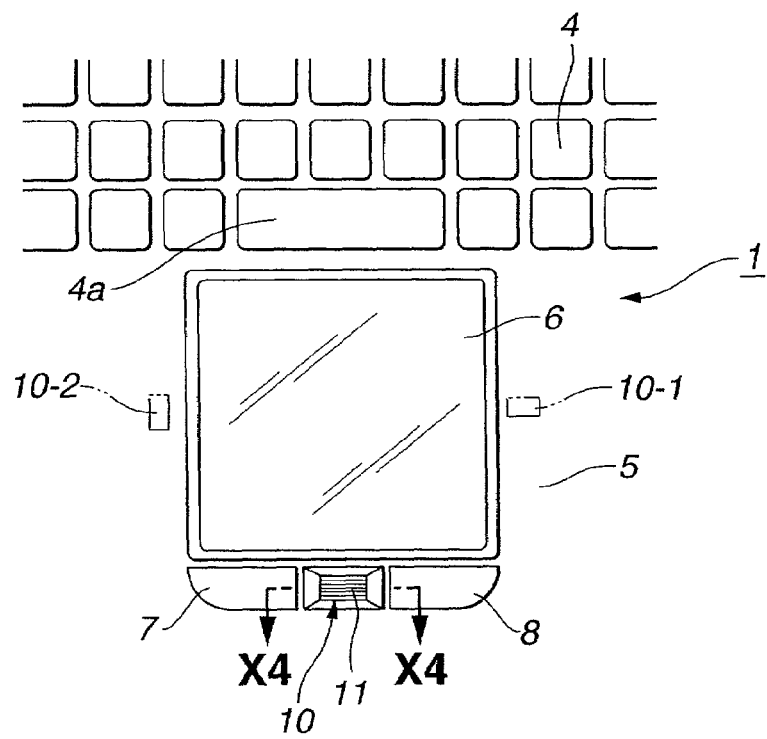
FIG. 8 is an enlarged plan view showing essential parts of FIG. 7.

A specific example of the operating unit 10 will be described later. The operating unit 10 has a rotating member 11. This rotating member 11 is formed to be elongated and extended in the left-and-right direction of the body 1, and a part of the rotating member 11 protrudes slightly upward from the palm rest 5. The rotating member 11 is to be rotated forward and backward around an axial line which is set in the left-and-right direction of the body 1 and substantially parallel to the upper surface of the body 1. The rotating member 11 can also be pressed downward. In FIG. 8, members indicated by chain-dotted lines and denoted by 10-1 and 10-2 are associated with another specific example of the operating unit 10 and these members will be described later.

The rotating member 11 of the operating unit 10 basically has three-dimensional displacement elements such as forward rotation, backward rotation, and press displacement. In addition to these displacement elements, the quantity of rotation in each direction of rotation and the rotation speed based on the calculation of the quantity of rotation can also be provided. In short, a number of different types of operation status of the rotating member 11 are provided and various functions are allocated in accordance with the different types of operation status, thus significantly improving the user-friendliness of the notebook model personal computer NP.

When the user carries out various inputs by using the keyboard 4 with his/her wrists or nearby parts supported on the palm rest 5, the touch pad 6 and the left and right click buttons 7, 8 are operated by the user's fingertip. Since the rotating member 11 of the operating unit 10 is near the touch pad 6 and also near the left and right click buttons 7, 8, the user need not largely move his/her hand during the input operation using the keyboard 4 and can rotate and press the rotating member 11, for example, with the tip of his/her forefinger or thumb. Thus, the operability of the rotating member 11 is improved. Moreover, since the rotating member 11 of the operating unit 10 is situated substantially in the middle of the left-and-right direction of the body 1, the operator can operate the rotating member 11 constantly with his/her dominant hand whether the operator is right-handed or left-handed. Therefore, the operability of the rotating member 11 is further improved.

Particularly, in this notebook model personal computer NP, the graphical user interface is displayed in accordance with the operation of the operating unit 10. Processing or an item list is selected on the graphical user interface.

The guide status and the list view status of the graphical user interface are displayed in accordance with the contents described in the script file, not only when the notebook model personal computer NP executes a jog dial-compatible application but also when the notebook model personal computer NP executes a jog dial-incompatible application.

Figure 9A:
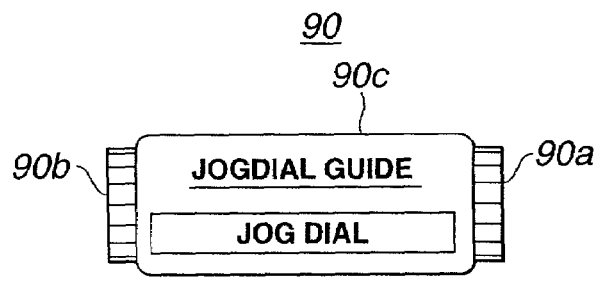
FIGS. 9A and 9B are views for explaining a guide status provided in a specific example of a graphical user interface.
Figure 9B:
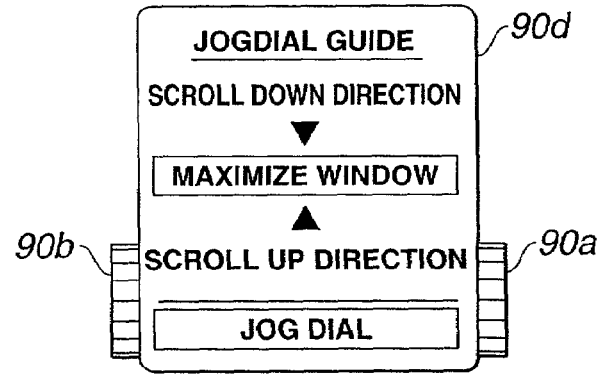

For example, if the rotating member 11 is operated in the direction of a backward arrow in FIG. 7, the graphical user interface (in the guide status 90 in FIG. 7) works so that a band-shaped display area 90d wound on a roll-shaped object 90c as shown in FIG. 9A looks like being extended upward in visually the same direction as the direction of rotation of the rotating member 11, from the roll-shaped object 90c, as shown in FIG. 9B. In this case, left and right ends 90a and 90b of the roll-shaped object 90c move to look like rotating. When the band-shaped display area 90d is fully extended, the left and right ends 90a and 90b stop rotating.

In the guide status 90 shown in FIGS. 9A and 9B, what processing the notebook model personal computer NP of FIG. 7 can currently carry out is displayed on the basis of the operation status of the operating unit 10, and the user is allowed to select processing.

In short, in the guide status 90, it is displayed how the notebook model personal computer NP operates if the operating unit 10 is operated at present. The guide status 90 is effective for displaying while shifting items for designating the functions/operations of the operating system such as scroll and selection of a menu item.

FIG. 9B shows the state in which the graphical user interface displays characters of "scroll down direction" and an inverted triangle as a set in the band-shaped display area 90d, in visual association with the direction of rotation of the rotating member 11 of the operating unit 10. Thus, when the rotating member 11 is rotated in the direction of an arrow indicating the front side shown in FIG. 7, the graphical user interface can explain to the user that the display in the active window can be scrolled down.

The graphical user interface also displays characters of "scroll up direction" and an upright triangle as a set in the band-shaped display area 90d. Thus, when the rotating member 11 is rotated in the direction of an arrow indicating the rear side shown in FIG. 7, the graphical user interface can explain to the user that the display in the active window can be scrolled up.

Moreover, as it is displayed that characters of "maximize window" are surrounded by a rectangular frame, the graphical user interface can explain to the user that the active window can be expanded to the maximum size when the rotating member 11 of the operating unit 10 is pressed.

Furthermore, when the user selects one of the above-described operations by using the operating unit 10 via the guide statues 90, the graphical user interface causes a control unit, which will be described later, of the notebook model personal computer NP to carry out the selected operation.

Figure 10A:
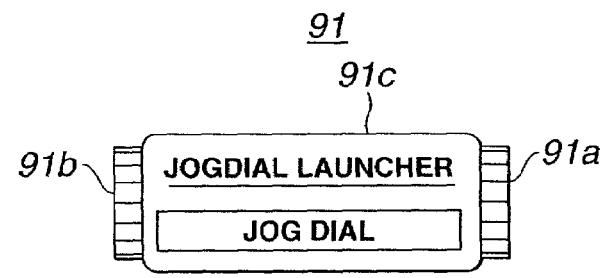
FIGS. 10A and 10B are views for explaining a list view status provided in the specific example of the graphical user interface of the present invention.
Figure 10B:
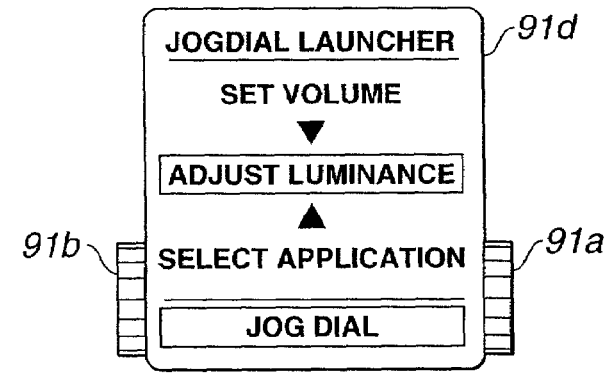

Other than the guide status 90, the graphical user interface takes a list view status 91 shown in FIGS. 10A and 10B. In the list view status 91, a list of items which can be executed in the notebook model personal computer NP is displayed on the basis of the operation status of the operating unit 10, and the user is allowed to select an item. In short, in the list view status 91, an item list of application programs provided in the notebook model personal computer NP is displayed.

In this list view status 91, too, the graphical user interface works so that a band-shaped display area 91d wound on a roll-shaped object 91c as shown in FIG. 10A looks like being extended upward in visually the same direction as the direction of rotation of the rotating member 11, from the roll-shaped object 91c, as shown in FIG. 10B. In this case, left and right ends 91a and 91b of the roll-shaped object 91c move to look like rotating. When the band-shaped display area 91d is fully extended, the left and right ends 91a and 91b stop rotating.

FIG. 10B shows the state in which a list of items "set volume," "adjust luminance," and "select application" is displayed in the band-shaped display area 91d, in visual association with the direction of rotation of the rotating member 11 of the operating unit 10. As the rotating member 11 is rotated in the direction of the forward or backward arrow shown in FIG. 7, "set volume," "adjust luminance," "select application" or another item is displayed and items which can be executed in the notebook model personal computer NP can be explained to the user. Moreover, the user is allowed to select a desired item by entering the desired item into a rectangular frame at the center. In this case, only the item in the rectangular frame at the center may be displayed with appropriate luminance, while the other items may be displayed with lower luminance than the appropriate luminance or displayed in such a manner as to be clearly distinguished from the item in the rectangular frame.

If no operation of the operating unit 10 is made by the user for a predetermined time period after the band-shaped display areas 90d and 91d of the guide status 90 and the list view status 91 are fully extended upward in visually the same direction as the direction of rotation of the rotating member 11, from the roll-shaped objects 90c and 91c, respectively, the graphical user interface takes up the band-shaped display areas 90d and 91d as if they were rolled up on the roll-shaped objects 90c and 91c, and then erases the band-shaped display areas 90d and 91d. In this case, the left and right ends 90a and 90b of the roll-shaped object 90c move to look like rotating, and after a while, they stop rotating. The graphical user interface will be described further in detail later.

Figure 11:
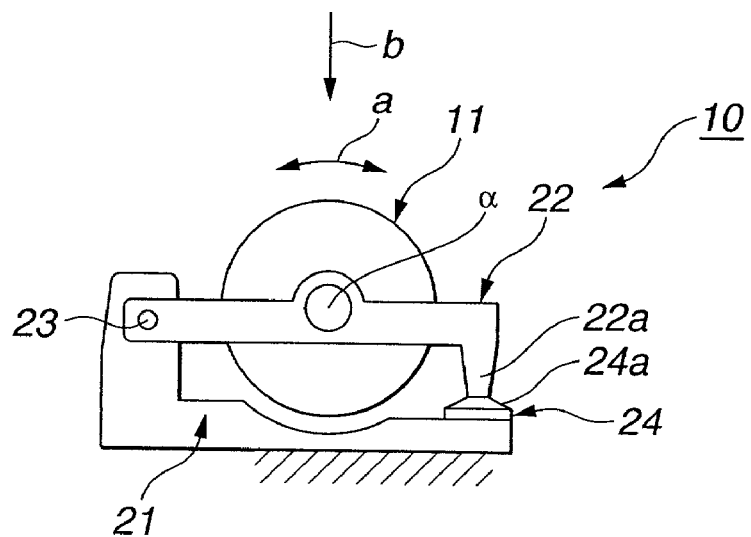
FIG. 11 shows the principle of a rotation/press-type operating unit.

The operating unit 10, with its operation on the notebook model personal computer NP explained by the graphical user interface to the user through an image, will now be described further in detail with reference to FIGS. 11 to 21. First, FIG. 11 shows an exemplary basic structure of the operating unit 10. A numeral 21 represents a board fixed to the body 1. A numeral 22 represents a holding bracket. The holding bracket 22 is mounted on the board 21 so that the holding bracket 22 can freely swing around a fulcrum 23. The rotating member 11 is held by the bracket 22 so that the rotating member 11 is rotatable forward and backward as indicated by an arrow a and the center of rotation is indicated by. The rotating member 11 constitutes a rotary encoder. As will be later described in detail in a specific example, when the rotating member 11 is rotated as indicated by the arrow a, the direction of rotation and the quantity of rotation can be detected.

A contact 24, which is turned ON when pressed, is mounted on the board 21. The holding bracket 22 has a press portion 22a formed thereon right above the contact 24. A movable contact terminal 24a to be an upper contact terminal of the contact 24 is made of a lead spring or the like, and normally, the contact 24 is set to be OFF. As the rotating member 11 is pressed as indicated by an arrow b against the spring force of the movable contact terminal 24a, the movable contact terminal 24a is pressed downward by the press portion 22a, thus turning the contact 24 ON.

A specific example of the operating unit 10 will now be described with reference to FIGS. 12 to 21. The same constituent elements as those described in FIG. 11 are denoted by the same numerals. The board 21 has a pair of left and right attachment holes 31 (FIG. 10) and is fixed by using screws 33 to attachment boss portions 32 formed in the body 1 (FIG. 12).

Figure 12:
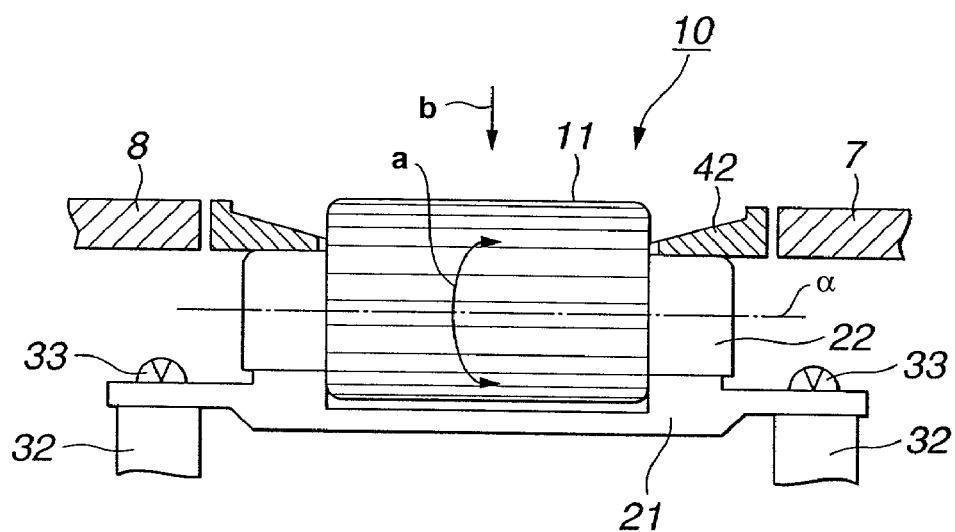
FIG. 12 is a cross-sectional view corresponding to a line X4—X4 in FIG. 8, showing a specific example of the operating unit.
Figure 15:
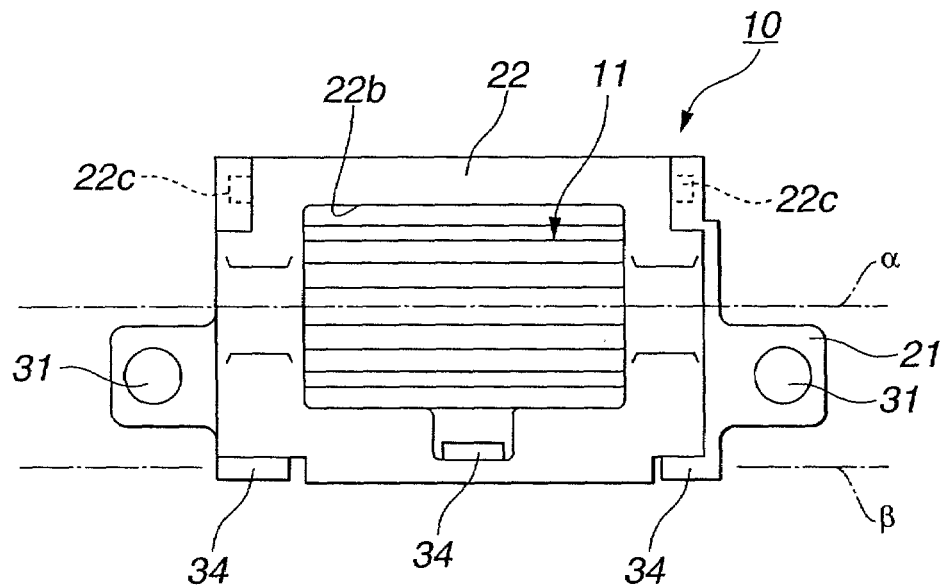
FIG. 15 is a top view of FIG. 13.
Figure 16:
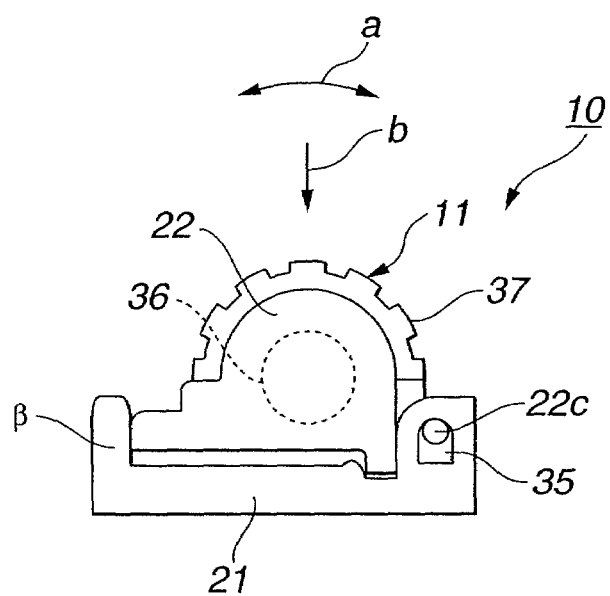
FIG. 16 is a right side view of FIG. 15.
Figure 17:
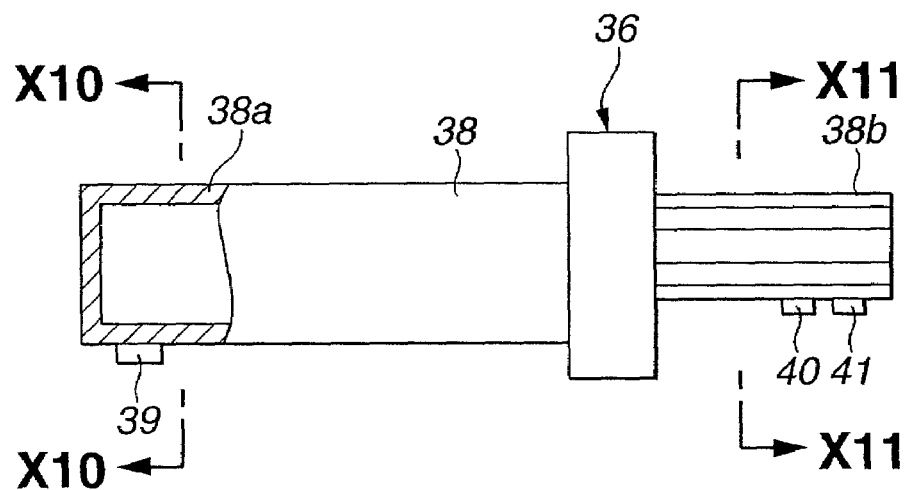
FIG. 17 is a partially cross-sectional side view showing a shaft member constituting a rotating member.

The holding bracket 22 has an aperture 22b having a substantially rectangular shape corresponding to the shape of the rotating member 11 (FIG. 12). One lateral edge portion of the holding bracket 22 is held between a plurality of holding pawls 34 provided in series on the board 21. An axial line connecting the plurality of holding pawls constitutes the swing fulcrum 23 of FIG. 11. The holding bracket 22 is slightly stroke-displaceable substantially straight in the up-and-down direction with respect to the holding pawls 34. The holding bracket 22 has a pair of left and right protruding shaft portions 22c on its other lateral edge portion, which is opposite to the side where the holding pawls 34 are situated. The shaft portions 22c are fitted into a pair of left and right holding holes 35 formed in the board 21 in such a manner that the shaft portions 22c are slightly displaceable in the up-and-down direction (FIGS. 15 and 16). Thus, the holding bracket 22 is held by the board 21 in such a manner that the holding bracket 22 can freely swing around the axial line and is slightly displaceable in the up-and-down direction.

The contact 24 is formed on the board 21 (FIGS. 13 and 14), and the press portion 22a on the lower surface of the holding bracket 22 is formed to be situated immediately above the movable contact terminal 24a having the spring property, as described above (FIG. 14). As the rotating member 11 is pressed, the contact 24 is turned ON. The contact 24 and the press portion 22a are arranged substantially at the middle part in the axial direction of the rotating member 11, and therefore are not to be shown in FIG. 13. However, in order to clarify the relation between the contact 24 and the press portion 22a, in FIG. 14, the positions of the contact 24 and the press portion 22a are slightly shifted in the axial direction of the rotating member 11 from their original positions.

Figure 13:
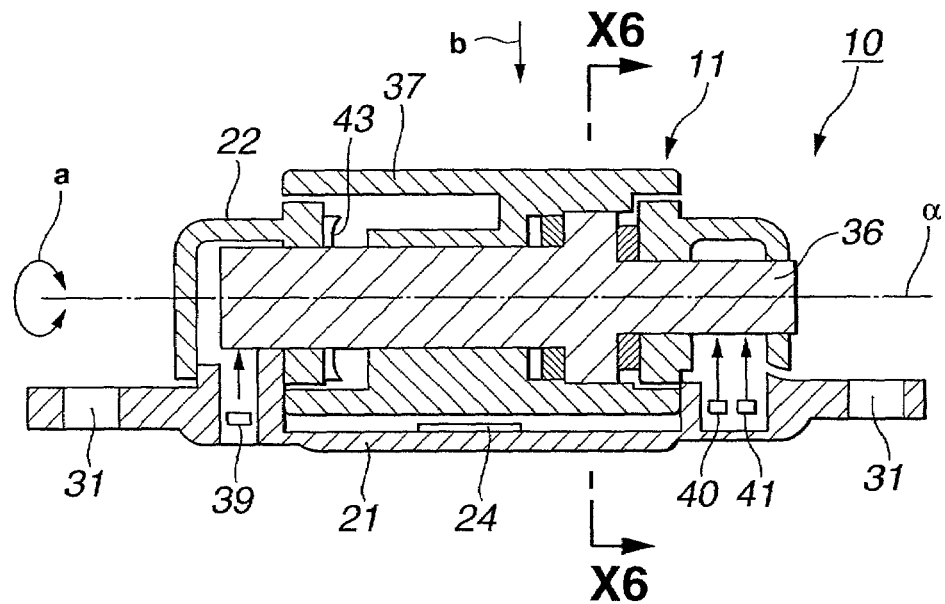
FIG. 13 is a cross-sectional view corresponding to a line X5—X5 in FIG. 14, showing the specific example of the operating unit.
Figure 14:
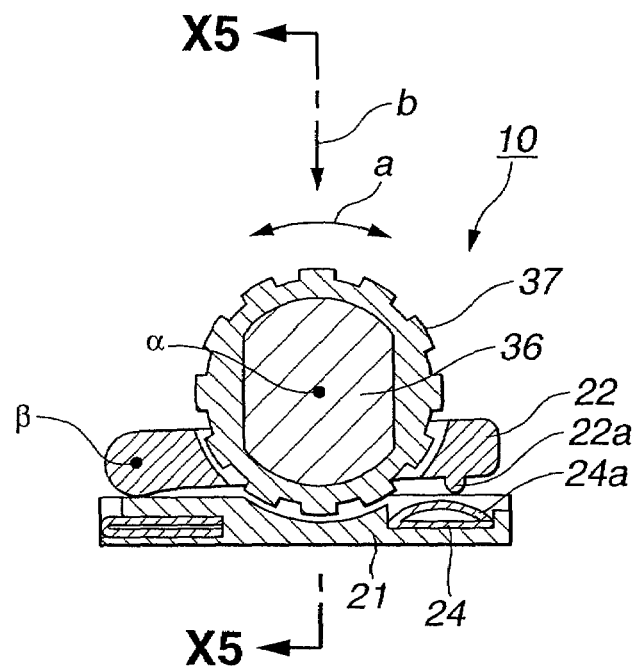
FIG. 14 is a cross-sectional view corresponding to a line X6—X6 in FIG. 13, showing the specific example of the operating unit.

The rotating member 11 has a shaft member 36 and a crust member 37 which is fitted and integrated with the outer circumference of the shaft member 36 (FIGS. 13 and 14). The shaft member 36 constitutes the rotation axis line and its left and right end portions are held by the holding bracket 22 so as to be rotatable forward and backward. Since the crust member 37 is directly touched by the operator, the crust member 37 is made of a soft synthetic resin or the like to restrain slip, and recesses and protrusions are provided at equal spacings in the circumferential direction on the outer circumference of the crust member 37 so as to prevent slip. A part of the crust member 37 is slightly projected above the holding bracket 22 through the aperture 22b of the holding bracket 22. Although not described in detail, the holding bracket 22 has a divided structure consisting of left and right parts in order to facilitate the assembly of the rotating member 11.

Figure 18:
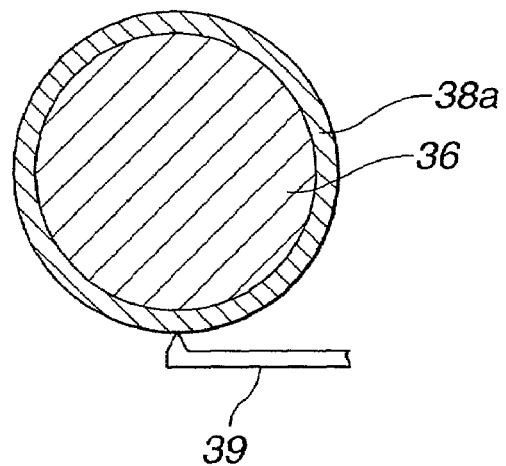
FIG. 18 is a cross-sectional view corresponding to a line X10—X10 in FIG. 17.
Figure 19:
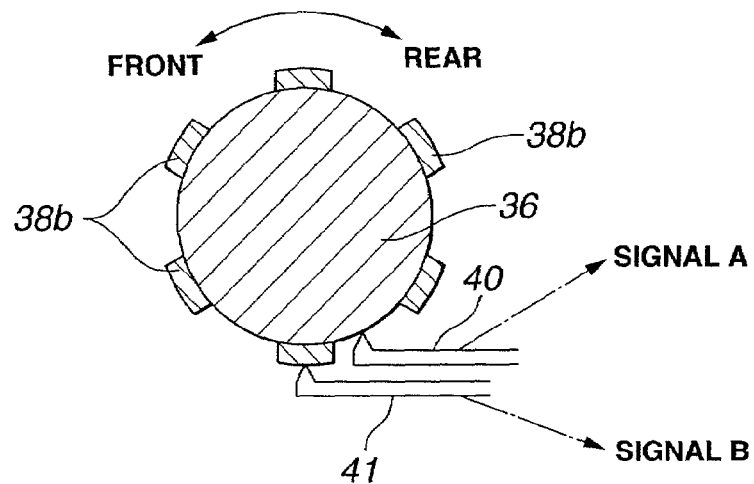
FIG. 19 is a cross-sectional view corresponding to a line X11—X11 in FIG. 17.

Each end portion of the shaft member 36 is not covered by the crust member 37 but is exposed (FIG. 13). While the shaft member 36 itself is made of a synthetic resin or the like to have insulation, a conductive coating 38 is applied on the outer circumference surface of the shaft member 36, as shown in FIGS. 17 to 20. In FIGS. 18 and 19, the conductive coating 38 is represented to be thicker than the actual one in order to clarify its existence.

The conductive coating 38 is set to exist over the whole circumferential length of the shaft member 36 at one end portion of the shaft member 36. This first portion existing over the whole circumferential length is denoted by 38a. At the other end portion of the shaft member 36, the conductive coating 38 is cut off at equal spacings in the circumferential direction of the shaft member 36. This second portion cut off at equal spacings is denoted by 38b.

An elongate input terminal 39 made of a conductive spring material is provided on the board 21, and this input terminal 39 is constantly in contact with the first portion 38a (FIG. 18). Moreover, elongate output terminals 40, 41 made of a conductive spring material are provided on the board 21, and the output terminals 40, 41 are energized toward the second portion 38b of the conductive member 38 (FIG. 19). The two output terminals 40, 41 are spaced away from each other in the axial direction of the shaft member 36 and are slightly deviated from each other in the circumferential direction of the shaft member 36.

Figure 20:
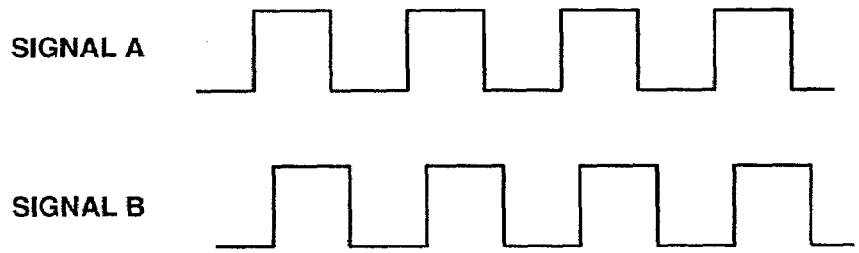
FIG. 20 is a time chart showing a signal status detected at each output terminal when the operating unit is rotated backward.
Figure 21:
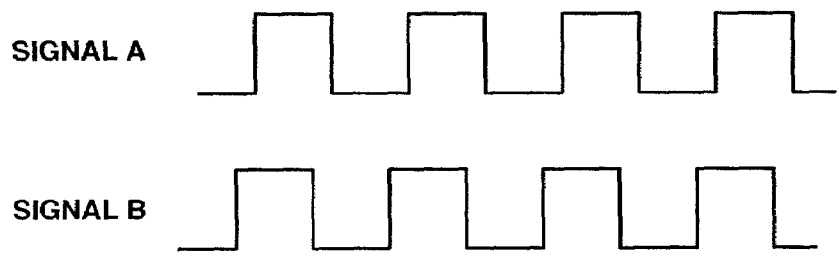
FIG. 21 is a time chart showing a signal status detected at each output terminal when the operating unit is rotated forward.

With a predetermined voltage applied from the input terminal 39, pulse-like voltage signals as shown in FIGS. 20 and 21 are detected from the output terminals 40, 41 in response to the rotation of the rotating member 11. The detected voltage from the output terminal 40 is represented as a signal A and the detected voltage from the output terminal 41 is represented as a signal B. The signal A and the signal B have a time difference in detection point such as a rise point or a fall point of the pulse. As the detection point of the signal A and the detection point of the signal B are compared with each other and which signal is detected first is determined, the direction of rotation of the rotating member 11 is identified. Moreover, by counting the number of detected pulses, it is possible to detect the quantity of rotation of the rotating member 11. By calculating the quantity of rotation per unit time, it is possible to detect the rotation speed of the rotating member 11.

A numeral 42 in FIG. 12 represents an ornamental plate, and a numeral 43 in FIG. 13 represents a leaf spring which provides appropriate rotational resistance to the rotating member 11.

Figure 22:
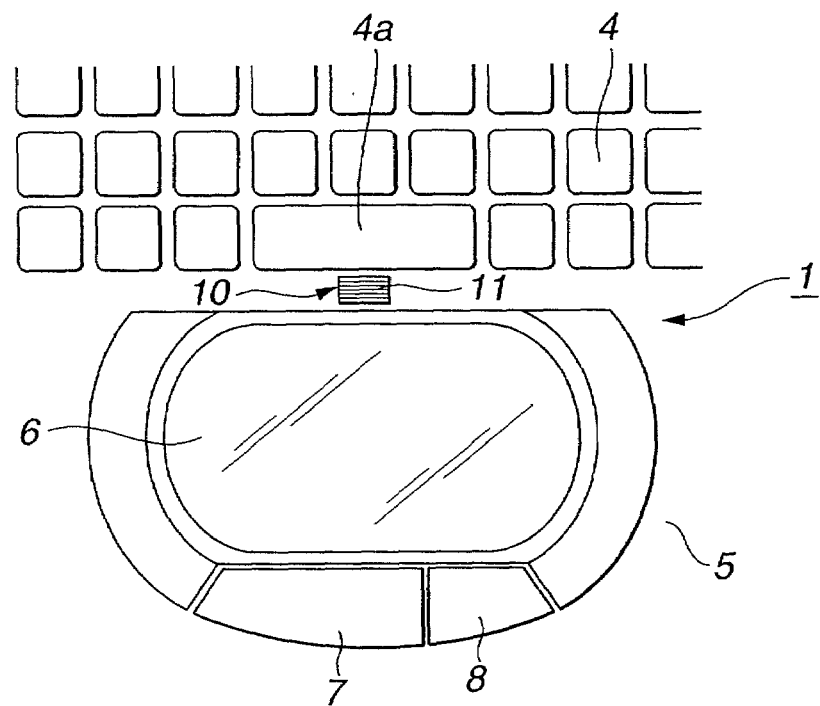
FIG. 22 is a plan view of essential parts corresponding to FIG. 8, showing another specific example of the notebook model personal computer.

FIGS. 22 to 25 show other specific examples of the operating unit 10, similarly to the numerals 10-1, 10-2 indicated by chain-dotted lines in FIG. 8. These specific examples correspond to FIG. 8. Hereinafter, these other specific examples of the operating unit 10 will be sequentially described. First, in the operating unit 10 shown in FIG. 22, compared with the case of FIG. 8, the shape of the touch pad 6 is changed in terms of design so that the left and right lateral edge portions are rounded, and the length in the left-and-right direction of the left click button 7, which is used more frequently, is made longer than the length in the left-and-right direction of the right click button 8, which is used less frequently. The operating unit 10 is arranged between the keyboard 4 and the touch pad 6 in the front-and-back direction. In this specific example, the rotating member 11 of the operating unit 10 is operated only by the user's forefinger.

Figure 23:
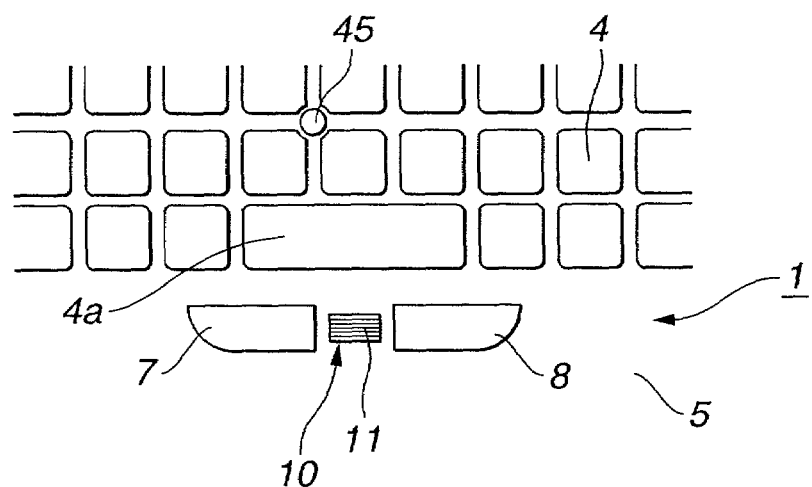
FIG. 23 is a plan view of essential parts corresponding to FIG. 8, showing another specific example of the notebook model personal computer.

FIG. 23 shows the case where a stick-type pointing device is employed. Specifically, a stick 45 extended in the up-and-down direction is provided near the space key 4a of the keyboard 4, and this stick 45 is operated to swing by the user's fingertip. The arrangement of the left and right click buttons 7, 8 and the operating unit 10 is similar to that of FIG. 8. The operating unit 10 is provided between the left click button 7 and the right click button 8 in the left-and-right direction. Since the touch pad 6 does not exist, the left and right click buttons 7, 8 and the operating unit 10 are situated near the keyboard 4 as a whole.

Figure 24:
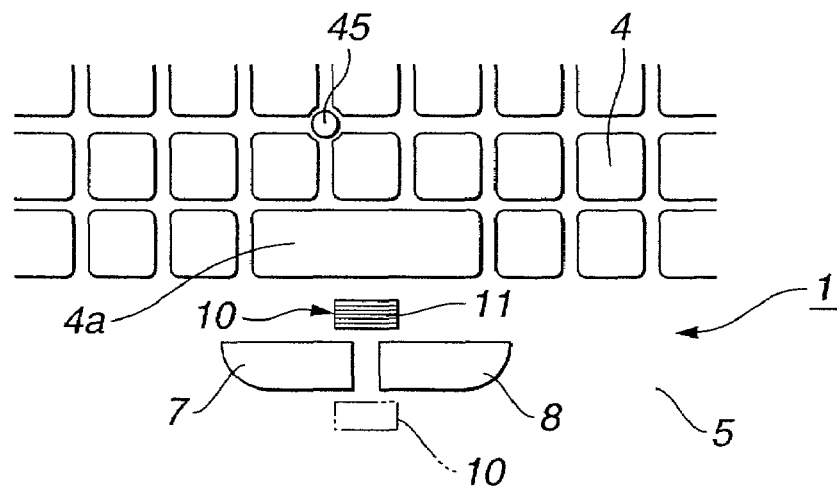
FIG. 24 is a plan view of essential parts corresponding to FIG. 8, showing another specific example of the notebook model personal computer.

FIG. 24 shows the case where a stick-type pointing device is employed similarly to the case of FIG. 23. However, the spacing between the left click button 7 and the right click button 8 in the left-and-right direction is smaller than the spacing in FIG. 23. The operating unit 10, as an example indicated by a solid line, is arranged between the left and right click buttons 7, 8 and the keyboard 4. The operating unit 10, as an example indicated by a chain-dotted line, is arranged before the left and right click buttons 7, 8.

Figure 25:
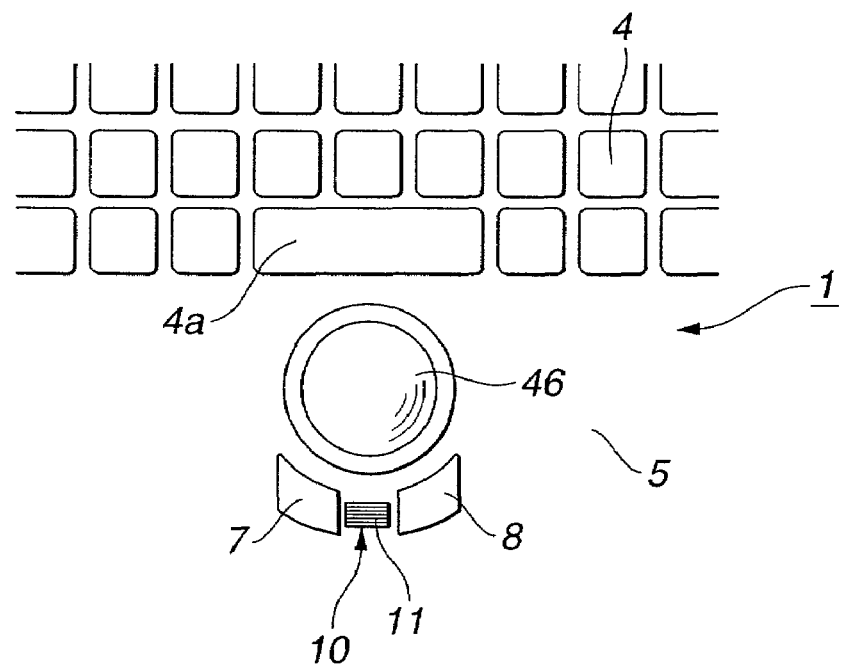
FIG. 25 is a plan view of essential parts corresponding to FIG. 8, showing another specific example of the notebook model personal computer.

FIG. 25 shows the case where a trackball-type pointing device is employed. Specifically, a trackball 46 is rotatably arranged before the keyboard 4, and this trackball 46 is operated to rotate by the user's fingertip. The left and right click buttons 7, 8 and the operating unit 10 area arranged before the trackball 46. The operating unit 10 may also be arranged before the left and right click buttons 7, 8, or may be arranged between the trackball 46 and the keyboard 4.

In another specific example indicated by chain-dotted lines in FIG. 8, there are two operating units 10-1 and 10-2 equivalent to the operating unit 10. The one operating unit 10-1 is provided on the right lateral side of the touch pad 6 and the other operating unit 10-2 is provided on the left lateral side of the touch pad 6. However, the one operating unit 10-1 is rotated in the front-and-back direction around the axial line in the left-and-right direction similarly to the operating unit 10 indicated by a solid line in FIG. 8, whereas the other operating unit 10-2 is rotated in the left-and-right direction as its rotation axis line is set to extend in the front-and-back direction. With respect to the one operating unit 10-1, the graphical user interface shown in FIGS. 7, 9 and 10 explains the operation on the notebook model personal computer NP.

Figure 26:
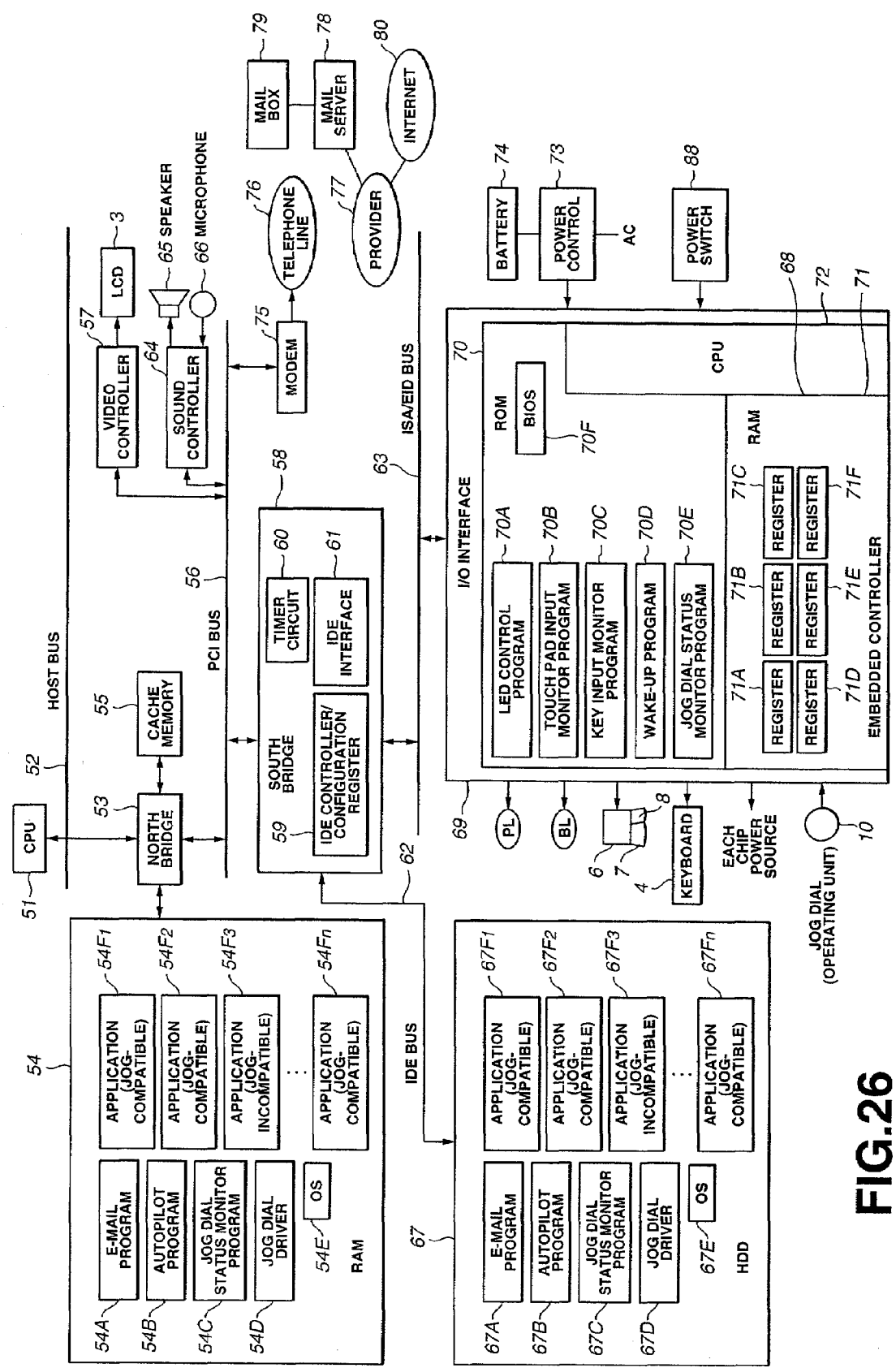
FIG. 26 shows an exemplary electrical structure of the notebook model personal computer.

An exemplary electrical structure of the notebook model personal computer NP which displays the graphical user interface on the display screen 3 will now be described with reference to FIG. 26. In the following description, the operating unit 10 is rotated in the front-and-back direction as in the example indicated by a solid line in FIG. 8. Alternatively, the operating unit 10 is expressed as a jog dial.

A central processing unit (CPU) 51 is constituted by, for example, a Pentium (trademark) processor by Intel Corporation, and is connected to a host bus 52. Moreover, a north bridge 53 is connected to the host bus 52, and the north bridge 53 is also connected to a PCI bus 56. The north bridge 53 is constituted by, for example, 400BX by Intel Corporation, and controls the CPU 51 and the periphery of a main memory 54. The north bridge 53 and a south bridge 58, which will be described later, constitute a so-called chip set.

The north bridge 53 is further connected with the main memory 54 and a cache memory 55. The cache memory 55 is to cache data used by the CPU 51. Although not shown, a primary cache memory is built within the CPU 51, too.

The main memory 54 is constituted by, for example, a DRAM (dynamic random access memory), and stores programs to be executed by the CPU 51 and data necessary for the operation of the CPU 51. Specifically, on completion of the start-up, for example, an e-mail program 54A, an autopilot program 54B, a jog dial status monitor program 54C, a jog dial driver 54D, an operating program (OS) 54E, and other application programs 54F1 to 54Fn are transferred to and stored in the main memory 54 from an HDD 67.

The e-mail program 54A is a program for transmitting and receiving communication texts through a network from a communication channel such as a telephone line 76 via a modem 75, which will be described later. The e-mail program 54A has a received mail acquisition function as a specific function. This received mail acquisition function is to access a mail server 78 of a provider 77 to confirm whether a mail addressed to the user is received in a mailbox 79 or not, and execute processing to acquire a mail addressed to the user if there is such a mail.

The autopilot program 54B is a program for sequentially starting and carrying out a plurality of preset processing or programs in a preset order.

The OS (operating system software) 54E is a program for controlling the basic operation of the computer, such as the so-called Windows 95 and Windows 98 (both of which are trademarks) by Microsoft Corporation and the so-called Mac OS (trademark) by Apple Computer, Inc.

The jog dial status monitor program 54C is a program for receiving a notification from each application as to whether the application is compatible with the jog dial or not, and for operating to display what operation can be carried out by operating the jog dial, that is, the operating unit 10, if the application is compatible with the jog dial. Normally, the jog dial monitor program 54C is waiting for an event from the operating unit 10 and also has a list for receiving a notification from an application. The jog dial driver 54D carries out various functions in accordance with the operation of the operating unit 10.

As the jog dial status monitor program 54C is executed by the CPU 51, it operates as the jog dial server 303. Specifically, when a jog dial-incompatible application is started up, the jog dial status monitor program 54C is executed by the CPU 51 and operates as the jog dial server 303. Thus, the jog dial server 303 loads the script file 301 from a predetermined storage, for example, via the Internet, and executes the operation (as the jog script engine 302) corresponding to the operation of the jog dial based on the status transition described in the script file 301.

A video controller 57 is connected to the PCI bus 56 and controls the display on the display screen 3 on the basis of data supplied via the PCI bus 56.

A sound controller 64 is connected to the PCI bus 56 and takes an input from a microphone 66 or supplies an audio signal to a speaker 65. Moreover, a modem 75 is connected to the PCI bus 56. The modem 75 can be connected to a communication network 80 such as the Internet and the mail server 78 via the telephone line 76 and the Internet service provider 77.

Also a south bridge 58 is connected to the PCI bus 56. The south bridge 58 is constituted by, for example, PIIX4E by Intel Corporation, and controls various I/Os (inputs/outputs). Specifically, the south bridge 58 is constituted by an IDE (integrated device electronics) controller/configuration register 59, a timer circuit 60, an IDE interface 61 and the like, and controls the devices connected to the IDE bus 62 and the devices connected thereto via an ISA/EIO (industry standard architecture/extended input/output) bus 63 and an embedded controller 68.

The IDE controller/configuration register 59 is constituted by two IDE controllers, that is, so-called primary IDE controller and secondary IDE controller, and a configuration register (not shown).

The primary IDE controller is connected to a connector (not shown) via the IDE bus 62, and also the HDD 67 is connected to the connector. The secondary IDE controller is electrically connected with connectors of bay devices as IDE devices including a CD-ROM drive, a second HDD, and an FDD, not shown, when these bat devices are loaded thereto via other IDE buses.

An e-mail program 67A, an autopilot program 67B, a jog dial status monitor program 67C, a jog dial driver 67D, an OS (operating system software) 67E and a plurality of application programs 67F1 to 67Fn are stored in the HDD 67. The programs 67A, 67B, 67C, 67D, 67E, 67F1 to 67Fn are sequentially transferred and stored into the RAM 54 in the process of boot-up processing.

Moreover, the embedded controller 68 is connected to the ISA/EIO bus 63. This embedded controller 68 is made up of a microcontroller and is used as an I/O controller. That is, the embedded controller 68 is constituted by interconnecting an I/O interface 69, a ROM 70, RAM 71 and a CPU 72.

In the ROM 70, an LED control program 70A, a touch pad input monitor program 70B, a key input monitor program 70C, a wake-up program 70D, and a jog dial status monitor program 70E are stored in advance.

The LED control program 70A is a program for controlling lighting of a power lamp PL, a battery lamp BL, and if necessary, a message lamp ML and other lamps made of LED. The touch pad input monitor program 70B is a program for monitoring the input by the user from the touch pad 6. The key input monitor program 70C is a program for monitoring the input from the keyboard 4 and other key switches. The wake-up program 70D is a program for checking whether a preset time point has been reached or not on the basis of the current time data supplied from the timer circuit 60 in the south bridge 58, and for managing each chip power source to start predetermined processing (or program) when the preset time is reached.

The jog dial status monitor program 70E is a program for constantly monitoring whether the rotating member 11 in the jog dial, that is, in the operating unit 10, is rotated or pressed. The jog dial status monitor program 70E will be later described in detail.

Moreover, a BIOS 70F is written in the ROM 70. The BIOS is the basic input/output system, which is a software program for controlling transmission (input/output) of data between the OS or application software and the peripheral equipments (display, keyboard, HDD and the like).

The RAM 71 has registers for LED control, touch pad input status, key input status and preset time, and an I/O register for monitoring the jog dial status, as registers 71A to 71F. For example, the LED control register 71A controls lighting of the message lamp ML for displaying an instantaneous boot-up status of e-mail, which will be described later, when the operating unit 10 is pressed. The key input status register 71C is adapted for storing an operation key flag when the operating unit 10 is pressed for single-touch operation, which will be described later. The preset time register 71D can arbitrarily set a certain time point.

The operating unit 10, the touch pad 6, the click buttons 7, 8 and the keyboard 4 are connected to the embedded controller 68 via connectors, not shown. The embedded controller 68 outputs signals corresponding to the operations of the operating unit 10, the touch pad 6, the click buttons 7, 8 and the keyboard 4, to the ISA/EIO bus 63. Also the power lamp PL, the battery lamp BL, the message lamp ML, and the other lamps made of LED are connected to the embedded controller 68.

Moreover, a power control circuit 73 is connected to the embedded controller 68. The power control circuit 73 is connected to an internal battery 74 or an AC power source. The power control circuit 73 supplies necessary power to each block and carries out control to charge the internal battery 74 and the second batteries of the peripheral devices.

The embedded controller 68 also monitors a power switch 88 which is operated when turning on and off the power source.

Even when the power source is off, the embedded controller 68 can execute the respective programs 70A, 70B, 70C, 70D and 70E constantly by using the internal power source. In short, these programs are constantly running, even when no windows are opened on the display screen 3 of the LCD. The embedded controller 68 is constantly executing the jog dial status monitor program 70E even when the power switch 88 is off and the OS 54E is not started up on the CPU 51. Particularly, though not described in detail, the embedded controller 68 provides a programmable power key (PPK) function even without having a dedicated key on the notebook model personal computer NP, and enables the user to start up desired software or script file simply by pressing the operating unit 10, in the power-saving status or when the power source is off.

Furthermore, a USB port and an IEEE 1394 port are connected to the embedded controller 68, though not shown. A USB cable is connected to the USB port. To the IEEE 1394 port, for example, a digital video camera is connected via an IEEE 1394 cable, and the IEEE 1394 port is used for taking video signals from the digital video camera into the notebook model personal computer NP.

Figure 27:
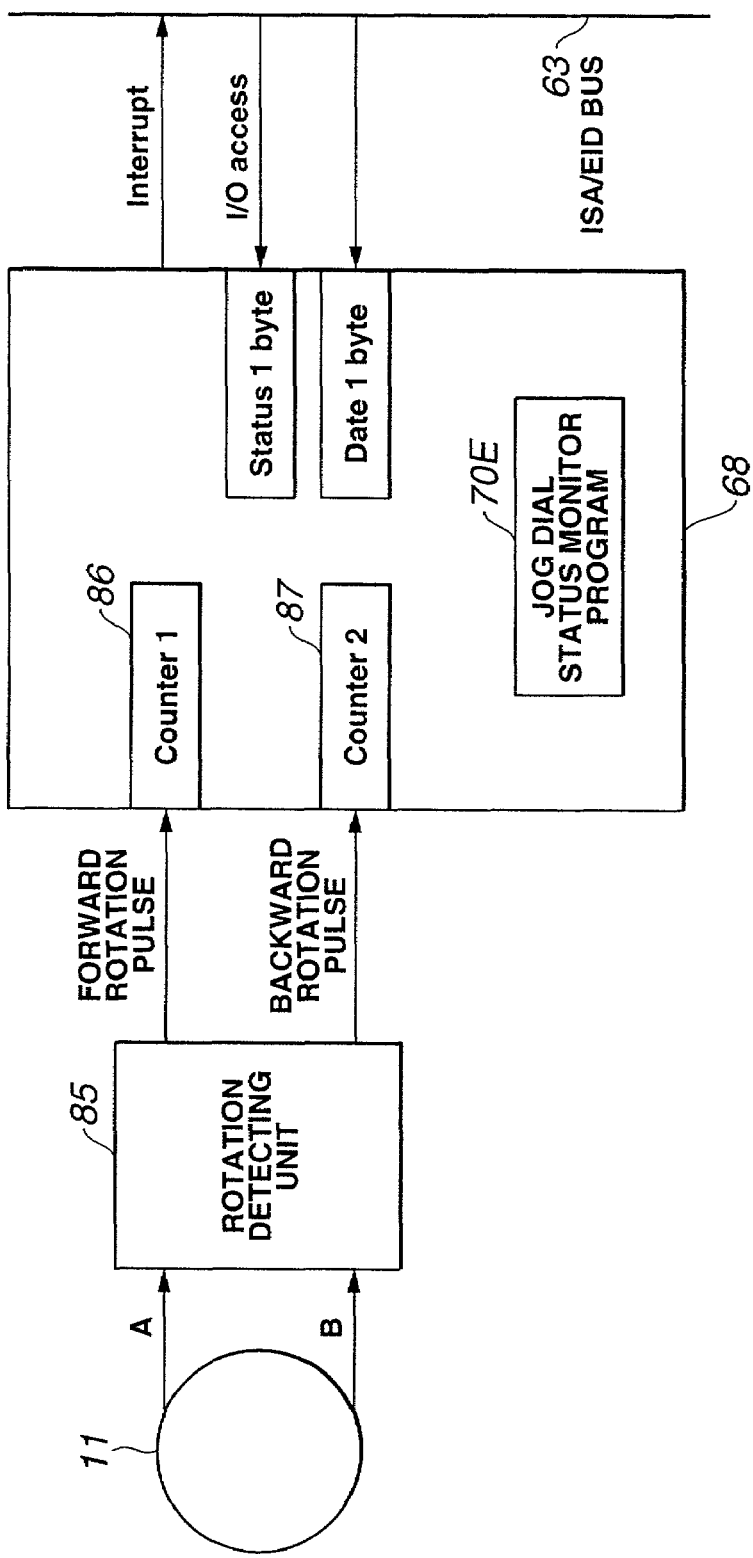
FIG. 27 is a block diagram showing an example of detecting the direction of rotation and the quantity of rotation of the operating unit.
Figure 28:
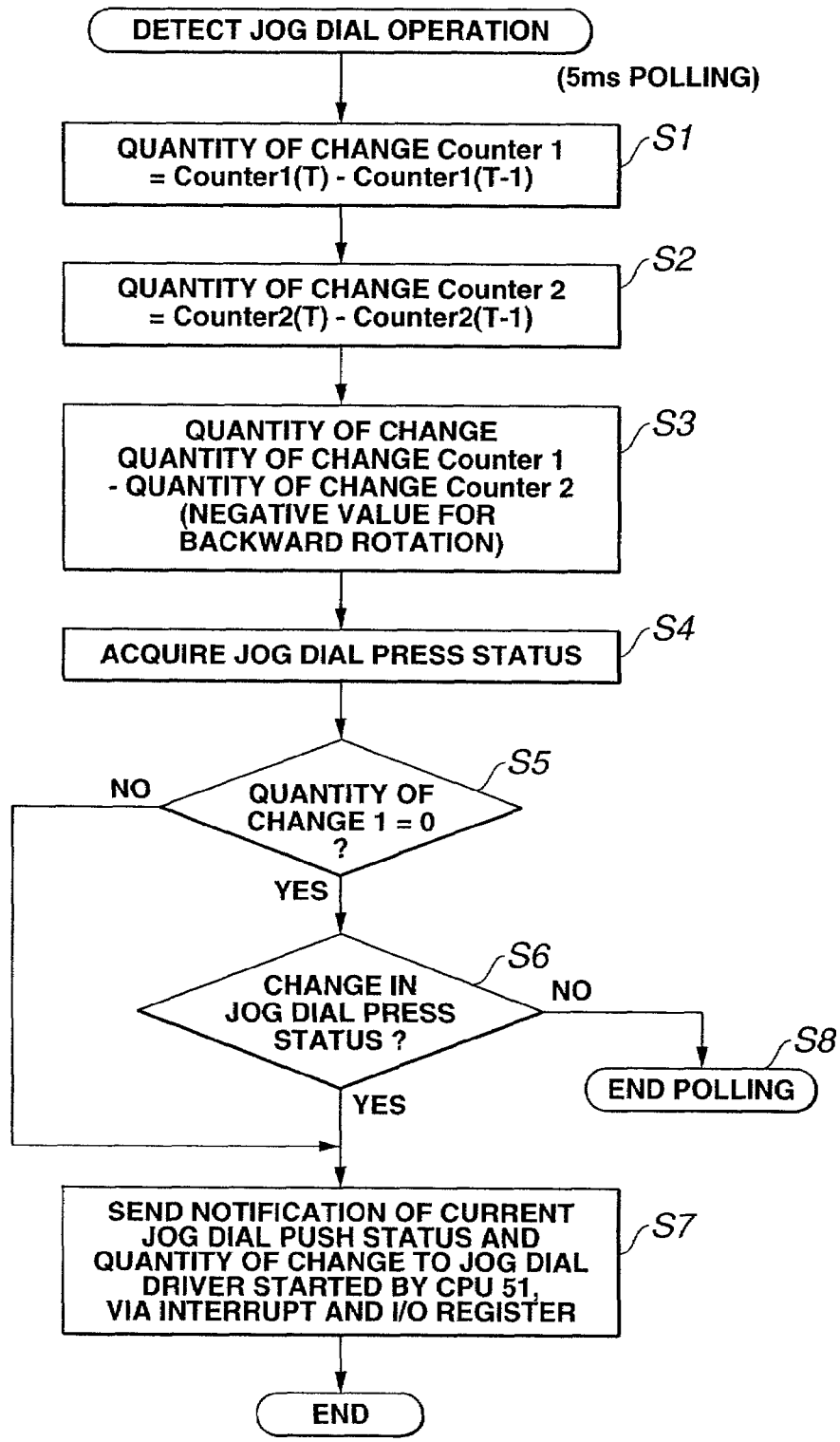
FIG. 28 is a flowchart for detecting the operation status of the operating unit.

The operation of the embedded controller 68 when it executes the jog dial status monitor program 70E will now be described with reference to FIGS. 20, 21, 27 and 28. FIG. 27 shows the hardware structure in which the embedded controller 68 monitors the rotation state of the rotating member 11 of the operating unit 10 via a rotation detecting unit 85. FIG. 28 is a flowchart when the embedded controller 68 executes the jog dial status monitor program 70E.

First, when the rotating member 11 of the operating unit 10 is rotated forward or backward, the rotation detecting unit 85 detects whether it is forward rotation or backward rotation on the basis of the timing of the signal A and the signal B shown in FIGS. 20 and 21. If forward rotation is detected, the rotation detecting unit 85 supplies a forward rotation pulse to a counter (1) 86 of the embedded controller 68. If backward rotation is detected, the rotation detecting unit 85 supplies a backward rotation pulse to a counter (2) 87 of the embedded controller 68. The embedded controller 68 executes the jog dial status monitor program 70E, thus monitoring the quantities of changes of the counter (1) 86 and the counter (2) 87 based on 5-ms polling, the difference in the quantity of change, and whether the operating unit 10 is pressed or not.

At step S1 in FIG. 28, with respect to the forward rotation pulse, a count value Counter1(T-1) at a time T-1 is subtracted from a counter value Counter1(T) at the current time T, thus finding a quantity of change Counter1 of the count value of the counter 86. At step S2, with respect to the backward rotation pulse, a count value Counter2(T-1) at a time T-1 is subtracted from a counter value Counter2(T) at the current time T, thus finding a quantity of change Counter2 of the count value of the counter 87. Then, at step S3, the difference in the quantity of change of the count value is calculated. That is, the difference between the quantity of change Counter1 and the quantity of change Counter2 is calculated. If this difference in the quantity of change has a negative value, it is backward rotation.

At step S4, the press status of the operating unit 10 is acquired. At step S5, the quantity of change calculated at step S3 is judged. At step S6, whether the press status of the operating unit 10 is changed or not is determined. If the quantity of change is detected at step S5, or if a change in the press status is detected at step S6, the processing goes to step S7 and the current press status of the operating unit 10 and the quantity of change are sent through the host bus 52 to the jog dial driver 54D started up by the CPU 51, by interrupt via the I/O register 71F.

If there is no change in the press status of the operating unit 10 at step S6, the processing goes to step S8 and ends polling. Then, the processing from step S1 is repeated again after 5 ms.

Exemplary displays of the graphical user interface corresponding to the input operation by the user using the operating unit 10 will now be described with reference to FIG. 10 and FIGS. 26 to 36. When the CPU 51 executes the jog dial status monitor program 54C after the power switch 88 in the electric circuit diagram of FIG. 26 is turned on, if there is no active application, the roll-shaped object 91c in the list view status 91 as shown in FIG. 10A is displayed on the display screen 3 as the user presses the operating unit 10.

When the user operates the rotating member 11 of the operating unit 10 in the direction of the backward arrow shown in FIG. 7, the list view status 91 works so that the band-shaped display area 91d wound on the roll-shaped object 91c looks like being extended upward in visually the same direction as the direction of rotation of the rotating member 11, from the roll-shaped object 91c, as shown in FIG. 10B. In this case, the left and right ends 91a and 91b of the roll-shaped object 91c move to look like rotating. When the band-shaped display area 91d is fully extended, the left and right ends 91a and 91b stop rotating.

In the band-shaped display area 91d shown in FIG. 10B, a list of items "set volume," "adjust luminance," and "select application" is displayed in visual association with the direction of rotation of the rotating member 11 of the operating unit 10. In practice, the displayed list may include items such as "contrast" and "font." Alternatively, by rotating the rotating member 11 of the operating unit 10 forward and backward, another item list may be scrolled for display in the display area 91d. Thus, in the list view status 91, the items which can be executed in the notebook model personal computer NP can be explained to the user.

For example, in the status shown in FIG. 4B, where "adjust luminance" is in the rectangular frame at the center, if the user rotates the rotating member 11 of the operating unit 10 of FIG. 7 in the direction of the backward arrow, "set volume" disappears from the band-shaped display area 91d and "adjust luminance" moves to the uppermost part. "Select application" enters the rectangular frame at the center and an item which was not displayed before, for example, "contrast," appears at the lowermost part.

On the other hand, in the status shown in FIG. 10B, if the user rotates the rotating member 11 of the operating unit 10 in the direction of the forward arrow, "select application" disappears from the band-shaped display area 91d and "adjust luminance" moves to the lowermost part. "Set volume" enters the rectangular frame at the center and an item which was not display before, for example, "font," appears at the uppermost part.

The higher the rotation speed of the rotating member 11 of the operating unit 10 is, the faster the item selection is carried out. In short, the rotation speed of the rotating member 11 of the operating unit 10 corresponds to the scroll speed.

Figure 29A:
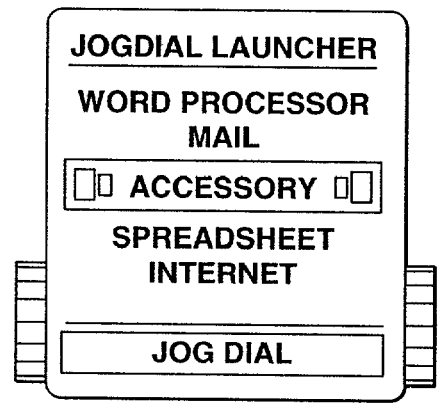
FIGS. 29A to 29C show exemplary displays of the graphical user interface.

Next, if the user operates the rotating member 11 of the operating unit 10 to put a desired item, for example, "select application," into the rectangle at the center and then presses the rotating member 11, applications such as "word processor," "mail," "accessory," "spreadsheet" and "Internet" are displayed as a sub menu of "select application," as shown in FIG. 29A.

These applications "word processor," "mail," "accessory," "spreadsheet" and "Internet" are registered to the launcher in advance, as jog dial-compatible applications.

Figure 29B:
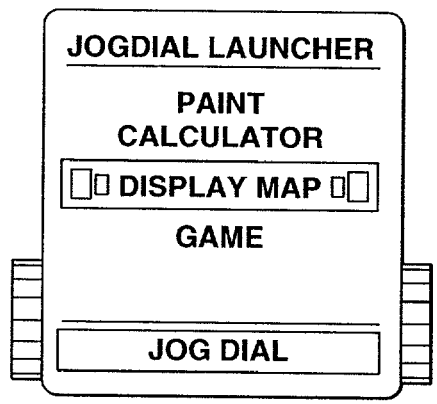
Figure 29C:
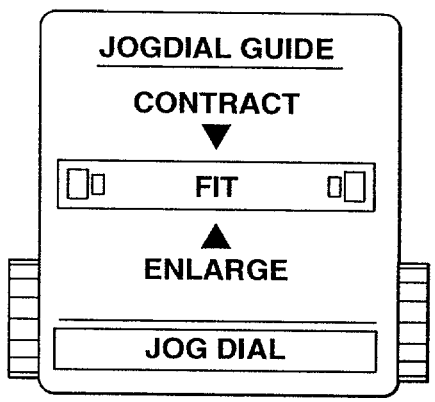

In the status shown in FIG. 29A, if the user rotates the rotating member 11 of the operating unit 10 and presses the rotating member 11 to select "accessory," items such as "paint," "calculator," "display map" and "game" constituting a sub menu of "accessory" are displayed as a secondary hierarchical display, as shown in FIG. 29B. If the user selects and executes an application "display map" by rotating and pressing the operating unit 10 in this secondary hierarchical display, the guide status 90 is containing enlargement, contraction and fitting of zoom is displayed, as shown in FIG. 29C.

Specifically, the application "display map" compatible with the jog dial is executed and this "display map" application is activated. Therefore, the operations which can be processed by the notebook model personal computer NP at this point are displayed by the guide status 90, as shown in FIG. 29C.

The foregoing operations will be summarized as follows. When the power switch 88 is ON and the predetermined OS 54E is started up on the CPU 51, if there is no activated application and the user presses the operating unit 10 only once, the press status of the operating unit 10 is received by the jog driver 54D on the basis of sending of the flag status via the I/O register by interrupt. Thus, the jog driver 54D sends an operation notification to the jog dial status monitor program 54C, which is similarly executed on the CPU 51.

Then, the roll-shaped object 91c of the list view status 91 of the graphical user interface is first displayed on the display screen 3. As the user rotates the rotating member 11 of the operating unit 10 in the direction of the backward arrow shown in FIG. 7, the band-shaped display area 91d wound on the roll-shaped object 91c is extended upward in visually the same direction as the direction of rotation of the rotating member 11.

In the band-shaped display area 91d, a list of items "set volume," "adjust luminance" and "select application" is displayed in visual association with the direction of rotation of the rotating member 11 of the operating unit 10 as shown in FIG. 10B. If "select application" is selected by operating the operating unit 10, a list of the jog dial-compatible application software, registered in advance, is displayed as shown in FIG. 29A.

Figure 30:
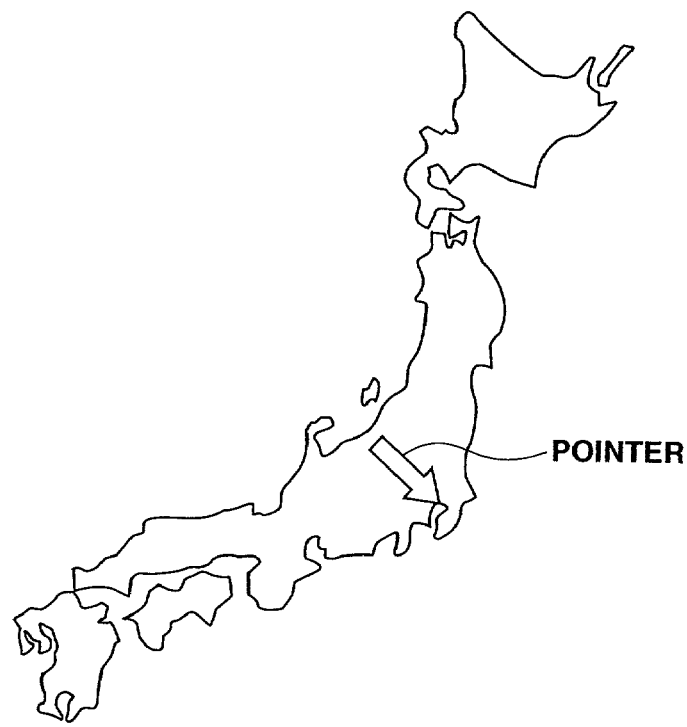
FIG. 30 shows an exemplary display based on an application program for displaying a map.
Figure 31:
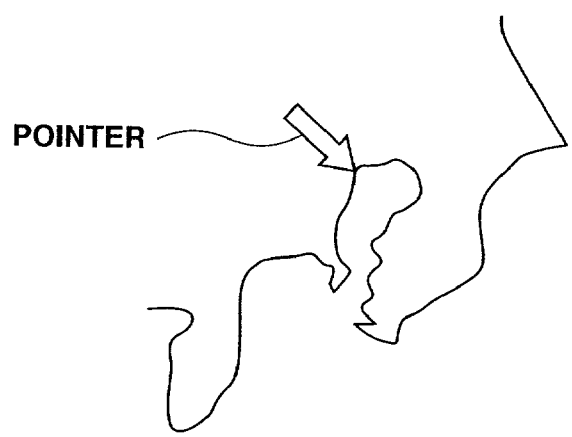
FIG. 31 shows another exemplary display based on the application program for displaying a map.

As an application "display map" is activated by the user's selection using the operating unit 10, a map of Japan shown in FIG. 30 is displayed on the display screen 3. At this point, the guide status 90 is displayed on the display screen as shown in FIG. 29C. If the user rotates the rotating member 11 of the operating unit 10 in the direction of the backward arrow in FIG. 7 while watching the guide status 90, an image centering on a point indicated by a pointer is enlarged, as shown in FIG. 31. On the other hand, if the user rotates the rotating member 11 in the reverse direction of the direction of rotation in the case where the image is enlarged, that is, if the user rotates the rotating member in the direction of the forward arrow in FIG. 7, the image is contracted (that is, the original size is restored). In this manner, in the predetermined application program having the image display function compatible with the jog dial, the image displayed on the display screen 3 can be contracted or enlarged in accordance with the rotation operation of the operating unit 10.

The hierarchical shift operation and display in the list view status 91 will now be described with reference to FIGS. 32A–32C to 36A–36C. An exemplary hierarchical shift from the list view status shown in FIG. 29A, in which a list of jog dial-compatible applications is displayed, to the list view status shown in FIG. 29B will be explained. As a matter of convenience, FIG. 29A shows the primary hierarchy while FIG. 29B shows the secondary hierarchy.

Figure 32A:
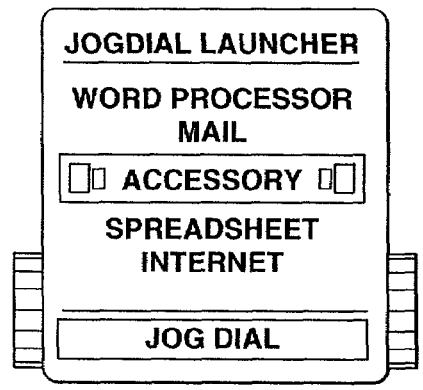
FIGS. 32A to 32C show the process of hierarchical shift of the graphical user interface.
Figure 32B:
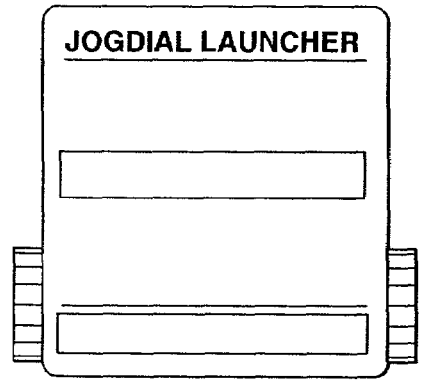
Figure 32C:
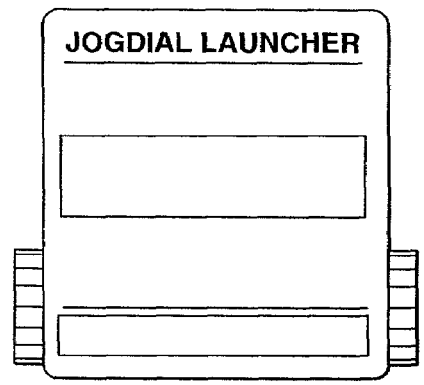
Figure 33D:
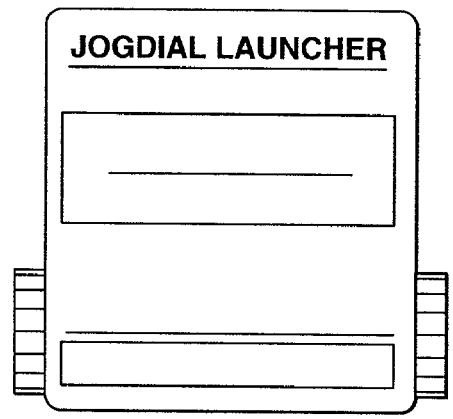
FIGS. 33D to 33F show the process of hierarchical shift of the graphical user interface.
Figure 33E:
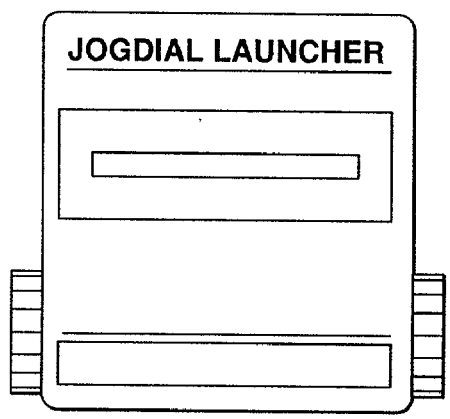
Figure 33F:
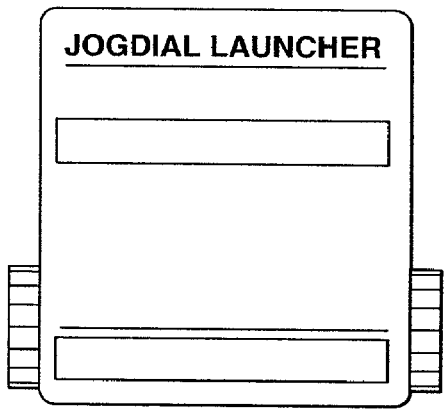
Figure 34G:
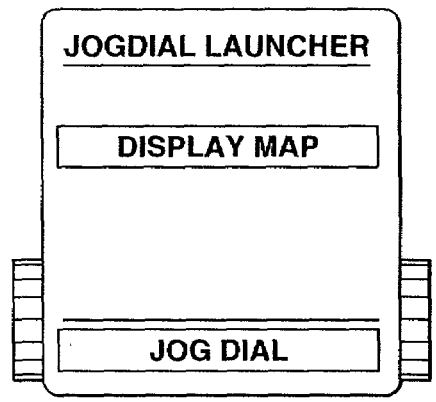
FIGS. 34G to 34I show the process of hierarchical shift of the graphical user interface.
Figure 34H:
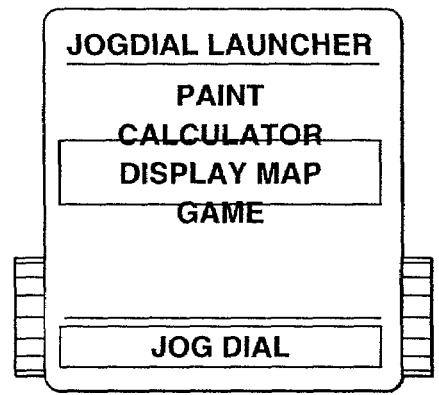
Figure 34I:
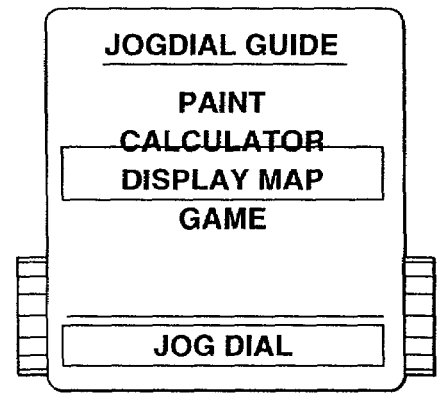
Figure 35J:
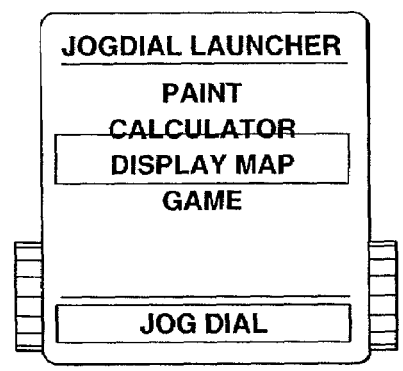
FIGS. 35J and 35K show the process of hierarchical shift of the graphical user interface.
Figure 35K:
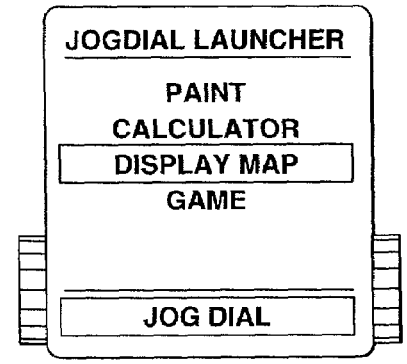

First, it is assumed that an item "accessory" in the list view status shown in FIG. 32A of the primary hierarchy is selected by operating the operating unit 10. Then, the rectangular frame at the center is gradually enlarged as shown in FIGS. 32B and 32C, and after a while, a new frame expands within the enlarged frame as shown in FIGS. 33D, 33E and 33F. Then, "display map", which is an item of the secondary hierarchy of "accessory," is displayed in the frame as shown in FIG. 34G, and other items such as "calculator," "paint" and "game" are displayed as they gradually expand as shown in FIGS. 34H, 34I and 35J. Finally, the items of the secondary hierarchy are displayed in a well-balanced manner as shown in FIG. 35K.

By providing marks for discriminating the current hierarchy near both ends of the rectangular frame at the center in FIGS. 29A to 29C, the user can be aware of the hierarchical shift operation.

Meanwhile, when the operating unit 10 is provided between the left click button 7 and the right click button 8 and near the touch pad 6 as shown in FIG. 7, it is desired to set the guide status 90, rather than the list view status 91, for the initial display of the graphical user interface immediately after the power switch is turned on. This is because the guide status for scroll is preferred in consideration of the linkage with the touch pad 6.

Figure 36A:
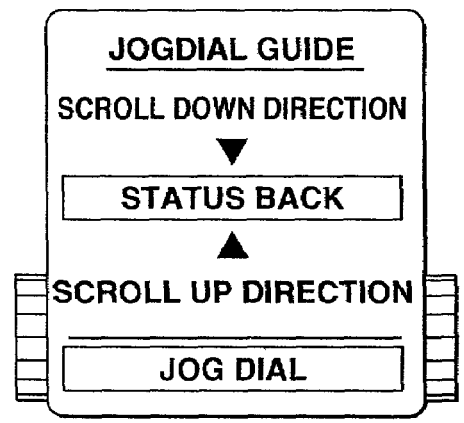
FIGS. 36A to 36C show exemplary displays of the graphical user interface.
Figure 36B:
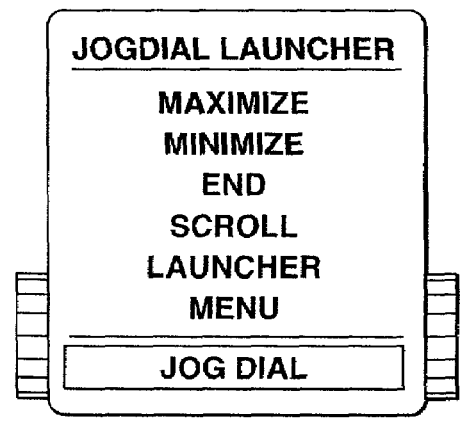
Figure 36C:
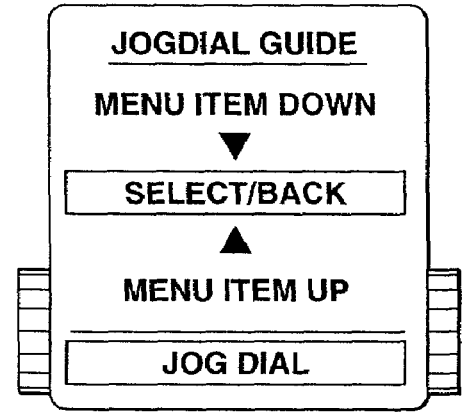

Specifically, after the power switch is turned on, the graphical user interface of the guide status as shown in FIG. 36A is displayed on the display screen 3 as a start display. Thus, the guide status for scrolling is set. If the rotating member 11 of the operating unit 10 is pressed so as to click "status back" in the rectangular frame at the center, the status shifts to the list view status shown in FIG. 36B. If "scroll" is selected in this list view status, the status returns to the guide status of FIG. 36A. If "menu" is selected in the list view status shown in FIG. 36B, the status shift to the guide status shown in FIG. 36C. In the guide status shown in FIG. 36C, selection of menu items in the up-and-down direction can be carried out in accordance with the rotation operation of the operating unit 10. If "select/back" in the frame is pressed by using the operating unit 10, the notebook model personal computer NP is caused to execute the selected menu item. If "select/back" is pressed longer by using the operating unit 10, the list view status shown in FIG. 36B is restored.

Meanwhile, not all the applications that are executed by the notebook model personal computer NP are compatible with the jog dial. That is, not all the applications that are stored in the HDD 67 and are stored into the RAM 54 on completion of the start-up processing of the OS 54E are compatible with the jog dial, and some applications are incompatible with the jog dial, such as the application 54F3. To the jog dial-compatible application and the jog dial-incompatible application, the CPU allocates different processing for the jog dial. Therefore, the jog dial-compatible application carries out notification processing to the jog dial status monitor program 54C, which is executed by the CPU 51.

First, the jog dial-compatible application declares that the application is compatible with the jog dial, to the jog dial status monitor program 54C. Then, the jog dial status monitor program 54C adds that application software to the list of jog dial-compatible software.

After that, the display of the jog dial menu may be changed to an application-specific display in the form of a jog dial guide to the user.

Specifically, the jog dial-compatible application provides the explanation of the jog dial operation in the current status, in the form of character strings, to the jog dial status monitor program 54C. Then, the graphical user interface is displayed and character strings such as jog dial guide, zoom, in, fit, and out are displayed.

The jog dial-compatible application changes the character strings in accordance with the status of the activated window, thus rewriting the list held by the jog dial monitor program 54C.

Therefore, when the jog dial-compatible application is active, the graphical user interface displays the explanation about what operation the application carries out in accordance with the operation of the jog dial, as in the guide status, in the form of character strings.

On the other hand, when the notebook model personal computer NP executes a jog dial-incompatible application, the jog dial status monitor program 54C is executed by the CPU 51 and thus operates as the jog dial server 303. Then, the jog dial server 303 loads the script file 301 from a predetermined storage, for example, via the Internet, and executes the operation (as the jog script engine 302) corresponding to the operation of the jog dial based on the status transition described in the script file 301.

Thus, the guide status or the list view status for making the display described in the script file 301 is displayed on the display screen 3.

As is described above, by displaying the guide status 90 as the graphical user interface on the display screen 3, the notebook model personal computer NP can explain to the user what processing can be carried out currently in accordance with the input operation by the user using the operating unit 10. Moreover, by displaying the list view status 91 as the graphical user interface, the notebook model personal computer NP can explain to the user the items which can be executed in accordance with the input operation by the user using the operating unit 10.

Therefore, the user need not repeat troublesome operations until the notebook model personal computer NP executes the processing desired by the user, and the user-friendliness can be improved.

Even when a jog dial-incompatible application is to be executed, the jog dial status monitor program 54C operating on the CPU 51 as the jog dial server 303 loads the script file 301 and decides the operation based on the status transition described in the script file 301. Therefore, the operation corresponding to the operation of the operating unit 10 (jog dial) can be carried out.

It is to be noted that the present invention is not limited to the notebook model personal computer and may also be applied to a portable information terminal device and a portable telephone device.

Figure 37:
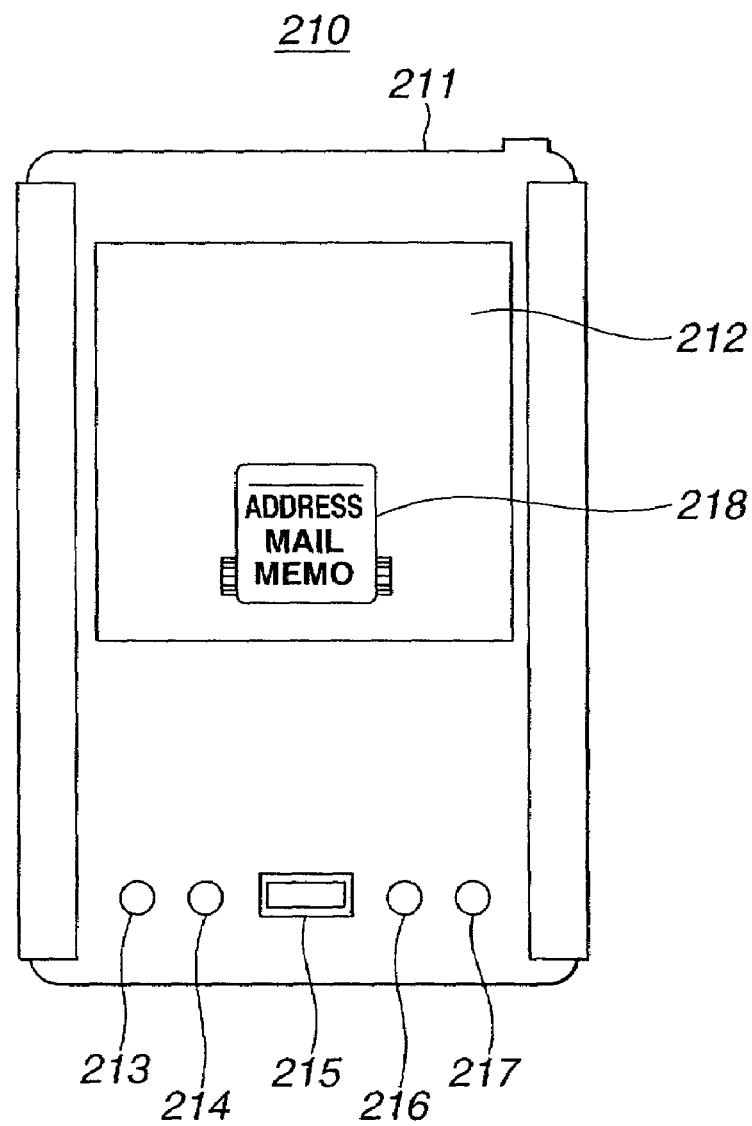
FIG. 37 is a plan view showing a portable information terminal device.

A portable information terminal device 210 shown in FIG. 37 has a display screen 212 made up of an LCD on the upper part of its body 211. On the lower part of the body 211, for example, a schedule button 213, an address book button 214, a "To Do" button 216 and a memo pad button 217 are provided. Moreover, an operating unit 215 having a rotating member similarly to the operating unit 10 is provided between the address book button 214 and the "To Do" button 216.

This portable information terminal device 210 has a CPU having an attached memory connected thereto via a bus, and has a display section, a character recognizing section, a sound recognizing section, a communication section and the like which are connected via buses, respectively.

The portable information terminal device 210 also has a speaker, an image pickup unit, and a microphone. A headphone terminal and line input and output terminals are provided, too. Therefore, the portable information terminal device 210 can carry out output/input of sounds and intake of images by image pickup. Moreover, the portable information terminal device 210 has an IEEE 1394 terminal and a USB terminal. Of course, the portable information terminal device 210 has a modem loaded thereon and can be connected to the Internet.

On the display screen 212, for example, a list view status 218 is displayed as the graphical user interface for explaining the operation of the operating unit 215 to the user through an image. Of course, a guide status is displayed, too, on the display screen 212 as the graphical user interface.

The above-described buttons, the displays on the display screen corresponding to the buttons, and the operation of the graphical user interface will now be described. The schedule button 213 is a button used for presenting on the display screen 212 a display which enables input and confirmation of the schedule, for example, every five minutes. The schedule input in this case is carried out by using a pen, not shown. The time can be shifted forward or back by input operation through the graphical user interface using the operating unit 215. The month and day may also be shifted.

The address book button 214 is a button used for displaying personal data such as the telephone number and address on the display screen 212. In this case, the respective data can be scrolled by input operation through the graphical user interface using the operating unit 215.

The "To Do" button 216 is a button used for listing and displaying items to be done such as work and business on the display screen 212. In this case, the respective items can be scrolled by input operation through the graphical user interface using the operating unit 215.

The memo pad button 217 is a button used for displaying a memo pad on the display screen 212 when the user wants to write down items that come across his/her mind. In this case, the respective items can be scrolled by input operation through the graphical user interface using the operating unit 215.

Moreover, in this portable information terminal device 210, when a jog dial-incompatible application is to be executed, the jog dial server loads the script file and executes the operation corresponding to the operation of the jog dial based on the status transition described in the script file.

Figure 38:
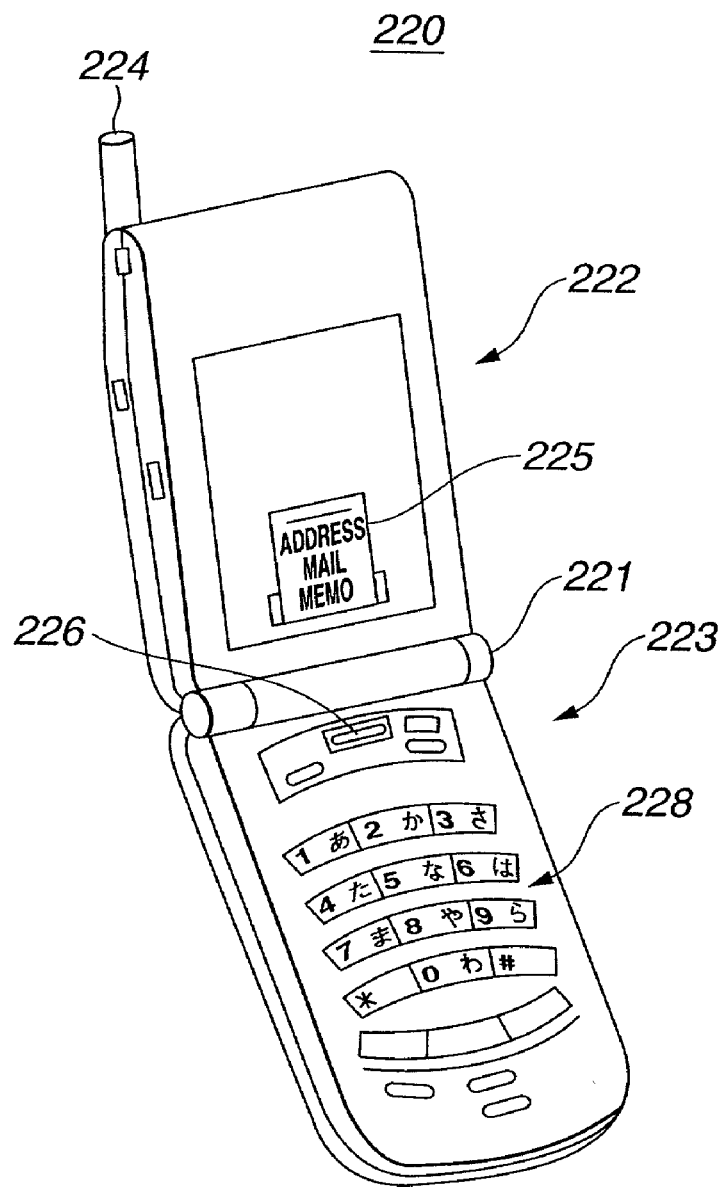
FIG. 38 is a perspective view showing a portable telephone device.

A portable telephone device 220 shown in FIG. 38 is such a type that a display section 222 and a body 223 can be rotated around a rotary shaft 221. An antenna 224 is provided on the upper left side of the display section 222 and a display screen made up of an LCD is provided at the center. Operation keys 228 are arranged at the center of the body 223. On the upper part of the body 223, an operating unit 226 having a rotating member similarly to the operating unit 10 is provided.

On the display screen, for example, a list view status 225 is displayed as the graphical user interface used for explaining the operation of the operating unit 226 to the user through an image. Of course, a guide status is displayed, too, on the display screen as the graphical user interface.

For example, when carrying out processing to retrieve a registered telephone number on the display screen in accordance with the input operation by the user using the operating unit 226, a registered telephone number retrieval item is selected by rotating and pressing the operating unit 226 from the list view status of the graphical user interface. Moreover, scrolling up and down may be carried out through the guide status and the operating unit may be pressed to dial a selected telephone number.

Moreover, in the portable telephone device 220, when a jog dial-incompatible application is to be executed, the jog dial server loads the script file and executes the operation corresponding to the operation of the jog dial based on the status transition described in the script file.

Figure 39:
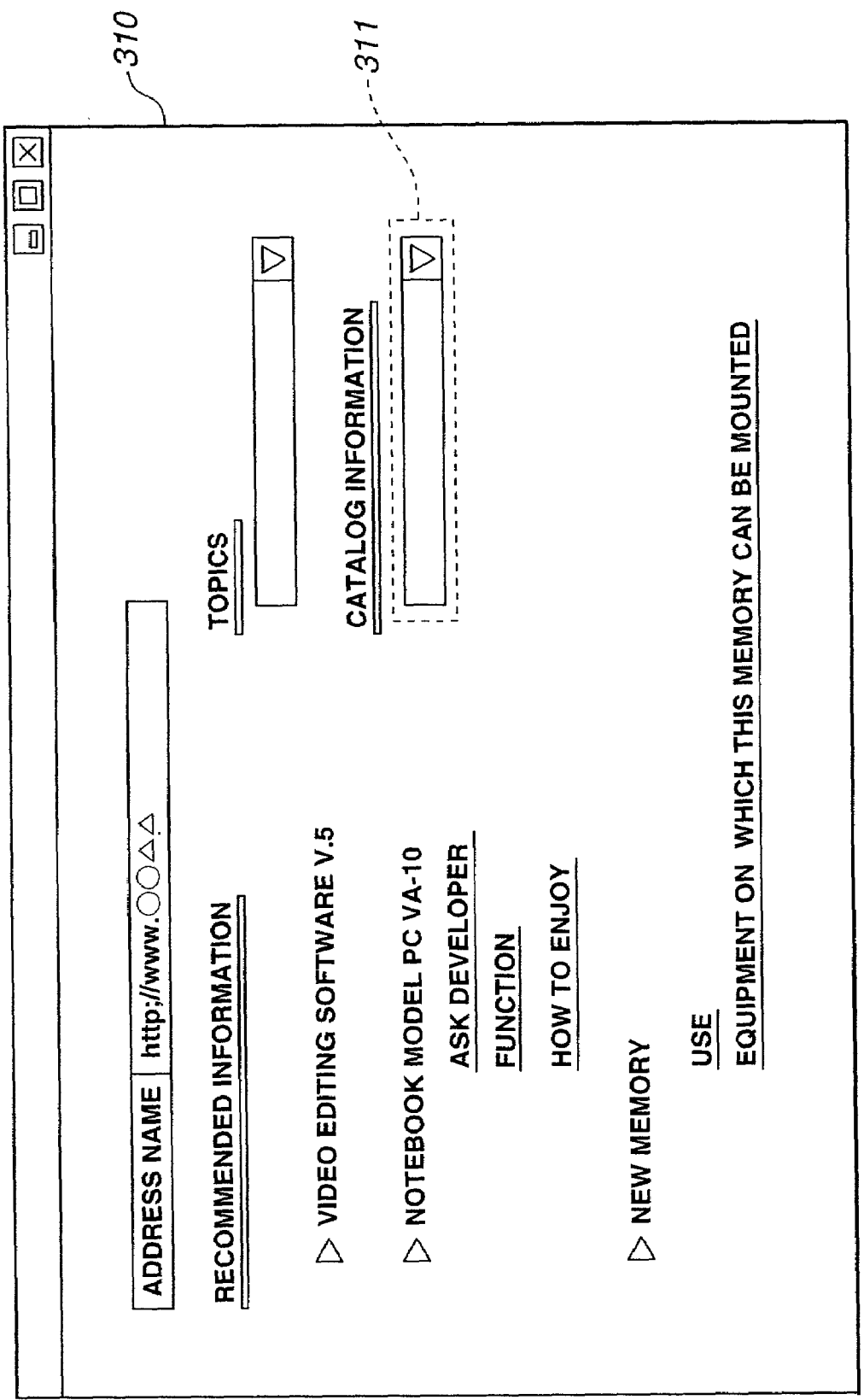
FIG. 39 is a view showing an exemplary display on the notebook model personal computer NP.

According to the present invention, the jog dial-compatible application or the jog dial-incompatible application can be caused to carry out a new operation. FIG. 39 shows an exemplary display 310 on the notebook model personal computer NP, in which a tab key on the web browser can be moved up and down by up and down operations of the jog dial and in which an image surrounding the link thereof can be prepared and an anchor can be moved. As the jog dial is rotated, an anchor 311 to be operated shifts to a place to which it can move (for example, an underlined position). By pressing the jog dial, the selection operation is carried out. Various such new operations can be prepared, depending on the type of the application.

As is described above, according to the present invention, the operation of the jog dial can be supported in various ways by using the script language, and as the jog dial, a jog dial provided on a lateral side of the body, which is commercially available, can be employed, as well as the center jog dial shown in FIG. 4. Moreover, the difference between the center jog dial and the lateral jog dial such as a right jog dial can be absorbed on the software side. The operation with respect to an application which is not compatible with the jog dial can be extended.

In the information processing device according to the present invention, server means loads a script file describing status transition of an input device in the script language at the time of start-up, then reads the status transition corresponding to the operation of the input device, and executes the operation corresponding to the status transition thus read. Therefore, the operation with respect to an application which is compatible with the jog dial can be extended. Moreover, the operation of the jog dial can be supported in various ways by using the script language.

In the information processing method and the program according to the present invention, at the processing execution step, a script file describing status transition of an input device in the script language is loaded at the time start-up, then the status transition corresponding the operation of the input device is read, and the operation corresponding to the status transition thus read is executed. Therefore, the operation with respect to an application which is compatible with the jog dial can be extended. Moreover, the operation of the jog dial can be supported in various ways by using the script language.

What is claimed is:

1. An information processing device for processing based on an input operation by a user using an input device for performing a first operation and a second operation, the information processing device comprising:
  server means for monitoring an operation notification by the input device and determining and executing the operation based on the operation notification;
  wherein the server means loads, at the time of start-up, a script file describing a status transition of the input device in the script language, the status transition based on hardware that can be supported by changing the script file and the status transition represents how each status shifts in a particular situation, and information relating to incompatible applications that are to be executed, reads the status transition corresponding to the operation of the input device, and executes the operation corresponding to the status transition; and execution means for executing a status monitor program for monitoring a difference in quantities of a first counter and a second counter based on polling which indicates a status shift for a particular situation, wherein said status shift corresponds to a first operation pulse and a second operation pulse calculated by the status monitor program.

2. The information processing device as claimed in claim 1, wherein the operation corresponding to the status transition read from the script file loaded by the server means is a display related to a graphical user interface of the input device.

3. The information processing device as claimed in claim 2, wherein the display related to the graphical user interface includes a first display status for displaying what processing the information processing device can currently carry out in accordance with the operation using the input device, and a second display status for displaying a list of items which can be executed on the information processing device in accordance with the operation of the input device.

4. The information processing device as claimed in claim 3, wherein the first display status is a guide status for guiding the operation of an application program, and the second display status is a list view status for display a list of application programs to be selected.

5. The information processing device as claimed in claim 1, wherein each of said first operation and said second operation are performed by rotating a dial.

6. An information processing method for information processing based on an input operation by a user using an input device for performing a first operation and a second operation, the method comprising:

a processing execution step of monitoring an operation notification by the input device and determining and executing the operation based on the operation notification;

wherein at the processing execution step, a script file describing a status transition of the input device in the script language is loaded at the time of start-up, the status transition based on hardware tat can be supported by changing the script file and the status transition represents how each status shifts in a particular situation, and information relating to incompatible applications that are to be executed, then the status transition corresponding to the operation of the input device is read, and the operation corresponding to the status transition is executed; and an execution step for executing a status monitor program for monitoring a difference in quantities of a first counter and a second counter based on polling which indicates a status shift for a particular situation, wherein said status shift corresponds to a first operation pulse and a second operation pulse calculated by the status monitor program.

7. A recording medium having an information processing program recorded thereon, the information processing program being adapted for information processing based on an input operation by a user using an input device for performing a first operation and a second operation, the information processing program comprising:

a processing execution step of monitoring an operation notification by the input device and determining and executing the operation based on the operation notification;

wherein at the processing execution step, a script file describing a status transition of the input device in the script language is loaded at the time of start-up, the status transition based on hardware that can be supported by changing the script file and the status transition represents how each status shifts in a particular situation, and information relating to incompatible applications that are to be executed, then the status transition corresponding to the operation of the input device is read, and the operation corresponding to the status transition is executed; and an execution step for executing a status monitor program for monitoring a difference in quantities of a first counter and a second counter based on polling which indicates a status shift for a particular situation, wherein said status shift corresponds to a first operation pulse and a second operation pulse calculated by the status monitor program.

8. A program recorded on a recoding medium related to information processing for information processing based on an input operation by a user using an input device for performing a first operation and a second operation, the program comprising:

a processing execution step of monitoring an operation notification by the input device and determining and executing the operation based on the operation notification;

wherein at the processing execution step, a script file describing a status transition of the input device in the script language is loaded at the time of start-up, the status transition based on hardware that can be supported by changing the script file and the status transition represents how each status shifts in a particular situation, and information relating to incompatible applications that are to be executed, then the status transition corresponding to the operation of the input device is read, and the operation corresponding to the status transition is executed; and an executing step for executing a status monitor program for monitoring a difference in quantities of a first counter and a second counter based on polling which indicates a status shift for a particular situation, wherein said status shift corresponds to a first operation pulse and a second operation pulse calculated by the status monitor program.

* * * * *